(12) United States Patent
Tanaka et al.

(10) Patent No.: US 12,385,757 B2
(45) Date of Patent: Aug. 12, 2025

(54) DISPLAY DEVICE AND DISPLAY METHOD

(71) Applicant: Panasonic Intellectual Property Management Co., Ltd., Osaka (JP)

(72) Inventors: Akira Tanaka, Osaka (JP); Toshiya Mori, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 336 days.

(21) Appl. No.: 18/120,134

(22) Filed: Mar. 10, 2023

(65) Prior Publication Data
US 2023/0302904 A1   Sep. 28, 2023

(30) Foreign Application Priority Data
Mar. 25, 2022   (JP) ................. 2022-050173

(51) Int. Cl.
*B60K 35/00* (2024.01)
*G01C 21/36* (2006.01)
(Continued)

(52) U.S. Cl.
CPC ............ *B60K 35/00* (2013.01); *G01C 21/365* (2013.01); *B60K 35/22* (2024.01); *B60K 35/28* (2024.01); *B60K 2360/167* (2024.01)

(58) Field of Classification Search
None
See application file for complete search history.

(56) References Cited

U.S. PATENT DOCUMENTS

| 5,404,307 A | 4/1995 | Odagawa |
| 5,644,082 A | 7/1997 | Iwata et al. |

(Continued)

FOREIGN PATENT DOCUMENTS

| JP | 03-194469 | 8/1991 |
| JP | 05-172575 | 7/1993 |

(Continued)

OTHER PUBLICATIONS

Office Action from Japan Patent Office (JPO) in Japanese Patent Appl. No. 2022-050173, dated Apr. 15, 2025, together with an English language translation.

*Primary Examiner* — Daniel L Greene
(74) *Attorney, Agent, or Firm* — Greenblum and Bernstein, P.L.C.

(57) ABSTRACT

A display device includes a processing circuit and a display. The processing circuit obtains an ambient temperature of a gyro sensor, obtains a sensitivity associated with a temperature range including the ambient temperature, corrects an angular velocity of the gyro sensor in accordance with the sensitivity, estimates a first estimated vehicle orientation based on the angular velocity corrected, estimates a second estimated vehicle orientation based on the angular velocity detected by the gyro sensor, derives a third estimated vehicle orientation by correcting the first estimated vehicle orientation using a position and a speed of vehicle, and updates the sensitivity of the temperature range using a calculated sensitivity that is based on the second estimated vehicle orientation and the third estimated vehicle orientation. The display displays an image that is in accordance with the third estimated vehicle orientation.

20 Claims, 16 Drawing Sheets

(51) Int. Cl.
  *B60K 35/22* (2024.01)
  *B60K 35/28* (2024.01)

(56) References Cited

U.S. PATENT DOCUMENTS

| | | | |
|---|---|---|---|
| 6,253,154 B1 | 6/2001 | Oshizawa et al. | |
| 7,337,062 B2 * | 2/2008 | Ohnishi | G01C 21/26 |
| | | | 342/357.74 |
| 11,280,917 B2 * | 3/2022 | Nishimura | G01S 19/45 |
| 2006/0064240 A1 * | 3/2006 | Wurth | B60C 23/061 |
| | | | 701/1 |
| 2009/0070058 A1 * | 3/2009 | Lin | F41G 3/14 |
| | | | 73/1.37 |
| 2009/0150075 A1 * | 6/2009 | Watanabe | G01C 21/005 |
| | | | 701/472 |
| 2009/0198444 A1 | 8/2009 | Takanashi et al. | |
| 2010/0106445 A1 | 4/2010 | Kondoh | |
| 2013/0261921 A1 * | 10/2013 | Bando | G01C 21/1652 |
| | | | 701/445 |
| 2015/0346914 A1 * | 12/2015 | Ebi | G06T 11/206 |
| | | | 715/781 |
| 2017/0131107 A1 | 5/2017 | Kondoh et al. | |
| 2019/0165387 A1 * | 5/2019 | Farnsworth | B60L 1/003 |
| 2019/0182415 A1 * | 6/2019 | Sivan | G06F 3/013 |
| 2020/0132462 A1 * | 4/2020 | Shibata | G01C 25/005 |
| 2021/0125417 A1 * | 4/2021 | Ando | B60R 11/02 |
| 2021/0389596 A1 * | 12/2021 | Fujita | B60K 35/10 |

FOREIGN PATENT DOCUMENTS

| | | |
|---|---|---|
| JP | 07-035636 | 2/1995 |
| JP | 08-014934 | 1/1996 |
| JP | 09-152341 | 6/1997 |
| JP | 09-257487 | 10/1997 |
| JP | 10-019585 | 1/1998 |
| JP | 10-246642 | 9/1998 |
| JP | 2006-071474 | 3/2006 |
| JP | 2007-155364 | 6/2007 |
| JP | 2007-155365 | 6/2007 |
| JP | 2009-204603 | 9/2009 |
| JP | 2010-101810 | 5/2010 |
| JP | 2010-160163 | 7/2010 |
| JP | 2016-114513 | 6/2016 |

\* cited by examiner

FIG. 6

Sensitivity table 107a

| Temperature range (°C) | Sensitivity |
|---|---|
| -40 ~ -30 | G0 |
| -30 ~ -20 | G1 |
| -20 ~ -10 | G2 |
| -10 ~ 0 | G3 |
| 0 ~ 10 | G4 |
| 10 ~ 20 | G5 |
| 20 ~ 30 | G6 |
| 30 ~ 40 | G7 |
| 40 ~ 50 | G8 |
| 50 ~ 60 | G9 |
| 60 ~ 70 | G10 |
| 70 ~ 80 | G11 |

Sensitivity history data 108b

| Ambient temperature (°C) | Sensitivity |
|---|---|
| 28 | Gn0 |
| 27.8 | Gn1 |
| 27.9 | Gn2 |
| 27 | Gn3 |
| ... | ... |

Sensitivity table

| Temperature range (°C) | Sensitivity |
|---|---|
| -40 ~ -30 | Interpolate by extrapolation |
| -30 ~ -20 | |
| -20 ~ -10 | |
| -10 ~ 0 | |
| 0 ~ 10 | |
| 10 ~ 20 | G5 |
| 20 ~ 30 | G6 |
| 30 ~ 40 | |
| 40 ~ 50 | |
| 50 ~ 60 | Interpolate by extrapolation |
| 60 ~ 70 | |
| 70 ~ 80 | |

FIG. 16

Sensitivity table

| Temperature range (°C) | Sensitivity | Reliability |
|---|---|---|
| −40 ~ −30 | G0 | T0 |
| −30 ~ −20 | G1 | T1 |
| −20 ~ −10 | G2 | T2 |
| −10 ~ 0 | G3 | T3 |
| 0 ~ 10 | G4 | T4 |
| 10 ~ 20 | G5 | T5 |
| 20 ~ 30 | G6 | T6 |
| 30 ~ 40 | G7 | T7 |
| 40 ~ 50 | G8 | T8 |
| 50 ~ 60 | G9 | T9 |
| 60 ~ 70 | G10 | T10 |
| 70 ~ 80 | G11 | T11 |

107c

DISPLAY DEVICE AND DISPLAY METHOD

CROSS REFERENCE TO RELATED APPLICATION

The present application is based on and claims priority of Japanese Patent Application No. 2022-050173 filed on Mar. 25, 2022.

FIELD

The present disclosure relates to a display device and the like which displays an image.

BACKGROUND

Conventionally, a display device has been proposed which projects light that presents an image on a plate-shaped light-transmissive display medium and causes the display medium to reflect the light, so that a user visually recognizes the image as a virtual image while allowing the user to view the background through the display medium. Such a display device is capable of displaying, in an actual background, an image related to the background. In particular, in the fields related to automobiles and the like, a so-called head-up display (HUD) has been developed which displays an image indicating the speed or various warnings as a virtual image in front of the windshield during driving.

By using such a display device, because the driver, who is the user, is able to view the image related to driving while looking at the outside in front of the driver without greatly moving the line of sight, safer driving can be achieved. Specifically, such a display device performs guidance display for navigating the vehicle. In other words, the display device superimposes, over the road surface, an image, such as a triangular image, indicating a method for guiding the vehicle to the destination (also referred to as a guidance direction).

In order to display such a triangular image properly, the orientation that the vehicle faces needs to be accurately recognized. The navigation device disclosed in Patent Literature (PTL) 1 calculates the orientation of the vehicle using the angular velocity detected by an angular velocity sensor and corrects the orientation based on the detection results obtained by sensors and the like other than the angular velocity sensor, in order to recognize the accurate orientation of the vehicle.

CITATION LIST

Patent Literature

PTL 1: Japanese Unexamined Patent Application Publication No. H5-172575

SUMMARY

However, the display device that is the navigation device according to PTL 1 can be improved upon.

In view of this, the present disclosure provides a display device and the like capable of improving upon the above related art.

A display device according to one aspect of the present disclosure includes: a sensitivity corrector which obtains an ambient temperature of an angular velocity sensor provided on a vehicle, obtains a sensitivity of the angular velocity sensor from a recording medium, and corrects an angular velocity detected by the angular velocity sensor in accordance with the sensitivity obtained, the ambient temperature being detected by a temperature sensor, the sensitivity of the angular velocity sensor being associated with a temperature range including the ambient temperature; a first orientation estimator which estimates, as a first estimated vehicle orientation, an orientation that the vehicle faces based on the angular velocity corrected; a second orientation estimator which estimates, as a second estimated vehicle orientation, the orientation that the vehicle faces based on the angular velocity detected by the angular velocity sensor; an orientation corrector which derives a third estimated vehicle orientation by correcting the first estimated vehicle orientation using a position of the vehicle determined by a satellite positioning system and a speed of the vehicle; a display which displays an image that is in accordance with the third estimated vehicle orientation; and an update processor which calculates, as a calculated sensitivity, the sensitivity of the angular velocity sensor based on the second estimated vehicle orientation and the third estimated vehicle orientation, and updates the sensitivity which is stored in the recording medium in association with the temperature range, using the calculated sensitivity.

General and specific aspects disclosed above may be implemented using a system, a method, an integrated circuit, a computer program, a computer-readable recording medium such as a CD-ROM, or any combination of systems, methods, integrated circuits, computer programs, or recording media. The recording medium may be a non-transitory recording medium.

A display device according to one aspect of the present disclosure is capable of improving upon the above related art.

Additional benefits and advantages according to one aspect of the present disclosure will become apparent from the description and drawings. The benefits and/or advantages may be individually obtained by various embodiments and features of the description and drawings, which need not all be provided in order to obtain one or more of the features.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 6 illustrates an example of updating of a sensitivity table according to the embodiment.

FIG. 16 illustrates an example of a sensitivity table according to Variation 2 of the embodiment.

DESCRIPTION OF EMBODIMENT

Figure 1:
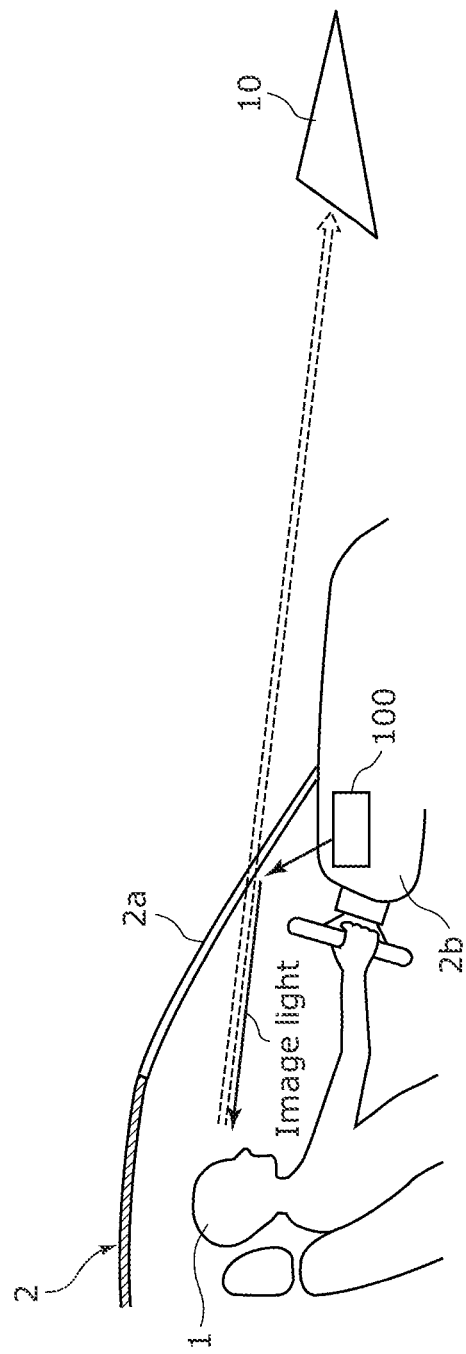
FIG. 1 illustrates a usage example of a display device according to an embodiment.

As described above, the display device that is the navigation device according to PTL 1 can be improved upon. In other words, the display device has such a problem that an appropriate image cannot be displayed to the user depending on the ambient temperature of the angular velocity sensor.

In order to solve the above problem, a display device according to one aspect of the present disclosure includes: a sensitivity corrector which obtains an ambient temperature of an angular velocity sensor provided on a vehicle, obtains a sensitivity of the angular velocity sensor from a recording medium, and corrects an angular velocity detected by the angular velocity sensor in accordance with the sensitivity obtained, the ambient temperature being detected by a temperature sensor, the sensitivity of the angular velocity sensor being associated with a temperature range including the ambient temperature; a first orientation estimator which estimates, as a first estimated vehicle orientation, an orientation that the vehicle faces based on the angular velocity corrected; a second orientation estimator which estimates, as a second estimated vehicle orientation, the orientation that the vehicle faces based on the angular velocity detected by the angular velocity sensor; an orientation corrector which derives a third estimated vehicle orientation by correcting the first estimated vehicle orientation using a position of the vehicle determined by a satellite positioning system and a speed of the vehicle; a display which displays an image that is in accordance with the third estimated vehicle orientation; and an update processor which calculates, as a calculated sensitivity, the sensitivity of the angular velocity sensor based on the second estimated vehicle orientation and the third estimated vehicle orientation, and updates the sensitivity which is stored in the recording medium in association with the temperature range, using the calculated sensitivity.

With this, the angular velocity is corrected in accordance with the sensitivity corresponding to the ambient temperature of the angular velocity sensor, and the third estimated vehicle orientation is derived using the corrected angular velocity. In a specific example, by correcting the first estimated vehicle orientation using the history of the position of the vehicle determined by the satellite positioning system up to a given time and the history of the speed of the vehicle up to the given time, the third estimated vehicle orientation can be derived as an accurate orientation of the vehicle at the given time. In other words, every time the period during which those histories are obtained passes, an accurate third estimated vehicle orientation can be derived. Here, within the period, the angular velocity detected by the angular velocity sensor may change depending on the change in ambient temperature. However, as described above, the angular velocity is corrected in accordance with the sensitivity corresponding to the ambient temperature of the angular velocity sensor. Hence, such changes in angular velocity sensor due to the change in ambient temperature can be reduced. Accordingly, even in the case described above, the third estimated vehicle orientation can be derived as an accurate orientation of vehicle. In other words, even in an environment where the ambient temperature changes, an appropriate third estimated vehicle orientation can be derived. As a result, an appropriate image can be displayed to the user while reducing an influence of the ambient temperature of the angular velocity sensor. Moreover, the sensitivity stored in the recording medium in association with the temperature range is updated using the calculated sensitivity calculated based on the second estimated vehicle orientation and the third estimated vehicle orientation. Accordingly, even when the angular velocity sensor degrades over time, the sensitivity of the angular velocity sensor can be maintained at an appropriate value. As a result, while maintaining the accuracy of the third estimated vehicle orientation, an appropriate image can be displayed to the user.

Moreover, it may be that when the vehicle makes a turn after passing a first spot and passes a second spot, the update processor calculates the calculated sensitivity based on an amount of change in the second estimated vehicle orientation estimated at each of the first spot and the second spot and an amount of change in the third estimated vehicle orientation derived at each of the first spot and the second spot.

With this, a calculated sensitivity is calculated based on the amount of change obtained when the vehicle makes a turn, that is, a calculated sensitivity is calculated when the orientation of the vehicle is greatly changed. Hence, the accuracy of the calculated sensitivity can be increased. As a result, it is possible to appropriately update the sensitivity associated with the temperature range.

Moreover, it may be that the orientation corrector: estimates a deviation of the orientation of the vehicle based on (a) a first position of the vehicle determined by the satellite positioning system, (b) a second position of the vehicle determined by the satellite positioning system when the vehicle moves from the first position, and (c) an estimated position of the vehicle estimated based on dead reckoning performed when the second position is determined, the dead reckoning being performed using the first position, the orientation of the vehicle at the first position, the angular velocity detected by the angular velocity sensor, and the speed of the vehicle; and corrects the first estimated vehicle orientation in accordance with the deviation of the orientation of the vehicle. For example, it may be that the orientation corrector estimates, as the deviation of the orientation of the vehicle, an angle formed by a straight line connecting the first position and the second position and a straight line connecting the first position and the estimated position.

With this, a travel trajectory is obtained by the satellite positioning system based on the first position and the second position, and a travel trajectory is obtained by dead reckoning based on the first position and the estimated position. The deviation of the orientation of the vehicle is then estimated based on such travel trajectories, and the first estimated vehicle orientation is corrected in accordance with the deviation of the orientation. Accordingly, the deviation of the orientation can be reduced, so that the third estimated vehicle orientation can be derived as an accurate orientation of the vehicle.

Moreover, it may be that the recording medium stores a sensitivity table indicating sensitivities each associated with a different one of a plurality of temperature ranges which are mutually different, and the sensitivity corrector: obtains, from the recording medium, a sensitivity which is associated with one of the plurality of temperature ranges in the sensitivity table, the one of the plurality of temperature ranges including the ambient temperature detected by the temperature sensor; and uses the sensitivity obtained to correct the angular velocity With this, for each temperature range, the angular velocity is corrected using a sensitivity table indicating the sensitivity of the angular velocity sensor corresponding to the temperature range. Accordingly, with an increase in the number of temperature ranges, the angular velocity can be more precisely corrected, and angular velocity correction can be performed for a wider range of ambient temperatures.

Moreover, it may be that the recording medium stores a sensitivity table which indicates sensitivities and reliabilities of the sensitivities, the sensitivities each being associated with a different one of a plurality of temperature ranges which are mutually different. It may be that the sensitivity corrector: determines whether or not a target reliability is greater than or equal to a threshold value in the sensitivity table, the target reliability being a reliability which is associated with one of the plurality of temperature ranges which includes the ambient temperature detected by the temperature sensor; when the target reliability is greater than or equal to the threshold value, obtains a sensitivity with the target reliability from the recording medium, and uses the sensitivity obtained to correct the angular velocity; and when the target reliability is less than the threshold value, derives an alternative sensitivity, and uses the alternative sensitivity to correct the angular velocity.

With this, adaptive processes that are in accordance with the reliability of the sensitivity can be performed. In other words, when the target reliability is low, the angular velocity is corrected using an alternative sensitivity instead of the sensitivity with the target reliability. Hence, an appropriate correction is more likely to be performed while reducing a correction that is performed based on an unreliable sensitivity.

Moreover, it may be that when the target reliability is less than the threshold value, the sensitivity corrector: obtains a low-reliability sensitivity and a high-reliability sensitivity from the recording medium, the low-reliability sensitivity being a sensitivity with a reliability that is the target reliability, the high-reliability sensitivity being a sensitivity with a reliability that is greater than or equal to the threshold value; and derives the alternative sensitivity by performing a weighted average on the low-reliability sensitivity and the high-reliability sensitivity using a weight that is based on the reliability of the low-reliability sensitivity and the reliability of the high-reliability sensitivity.

With this, when the target reliability is low, by using a high-reliability sensitivity, an alternative sensitivity with a reliability that is higher than a low-reliability sensitivity with the target reliability is more likely to be derived. Accordingly, an appropriate correction of the angular velocity is more likely to be performed by using such an alternative sensitivity.

Moreover, it may be that when the target reliability is less than the threshold value, the sensitivity corrector: obtains a first sensitivity and a second sensitivity from the recording medium, the first sensitivity and the second sensitivity each being a sensitivity with a reliability that is greater than or equal to the threshold value; and derives the alternative sensitivity by performing extrapolation, interpolation or linear interpolation on a sensitivity based on (i) the first sensitivity and the second sensitivity, (ii) a temperature range associated with the first sensitivity and a temperature range associated with the second sensitivity, and (iii) a temperature range associated with the target reliability.

With this, when the target reliability is low, by using, for example, the first sensitivity and the second sensitivity with high reliabilities and linearity of the sensitivity for each temperature range, an alternative sensitivity with a reliability that is higher than the sensitivity with the target reliability is more likely to be derived. Accordingly, an appropriate correction of the angular velocity is more likely to be performed by using such an alternative sensitivity.

Moreover, it may be that the sensitivity corrector uses a sensitivity with the target reliability as the alternative sensitivity when the target reliability is less than the threshold value and is greater than remaining one or more of the reliabilities indicated in the sensitivity table.

With this, when the target reliability is low and all the other reliabilities indicated in the sensitivity table are lower than the target reliability, for example, the sensitivity with the target reliability is used without a change as an alternative sensitivity. Accordingly, it is possible to prevent a less reliable sensitivity from being derived using another reliability indicated in the sensitivity table, and the angular velocity from being corrected using such an unreliable sensitivity.

Moreover, it may be that in updating a sensitivity indicated in the sensitivity table using the calculated sensitivity, the update processor further updates the reliability of the sensitivity indicated in the sensitivity table.

With this, the sensitivity indicated in the sensitivity table and the reliability of the sensitivity can be appropriately maintained.

Moreover, it may be that in updating the reliability of the sensitivity, the update processor updates the reliability of the sensitivity in accordance with travel data which indicates a traveling state of the vehicle obtained when the calculated sensitivity is calculated.

The accuracy of the calculated sensitivity changes depending on the traveling state of the vehicle. Hence, by updating the reliability of the sensitivity indicated in the sensitivity table in accordance with the travel data, the accuracy of the calculated sensitivity is reflected and the reliability can be appropriately updated.

Moreover, it may be that the update processor updates the reliability of the sensitivity to a higher reliability with an increase in an angle of a turn made by the vehicle, the angle being indicated by the travel data.

With an increase in the angle of the turn made by the vehicle, the accuracy of the calculated sensitivity increases. Accordingly, by updating the reliability of the sensitivity to a higher reliability with an increase in the angle, the reliability can be appropriately updated.

Moreover, it may be that the update processor updates the reliability of the sensitivity to a higher reliability with an increase in a distance of each of two straight sections indicated by the travel data, and the two straight sections are sections where the vehicle traveled straight before and after making a turn.

The accuracy of the calculated sensitivity increases with an increase in the distance between each two straight sections. Hence, by updating the reliability of the sensitivity to a higher reliability with an increase in the distance, the reliability can be updated appropriately.

Moreover, it may be that the update processor updates the reliability of the sensitivity to a higher reliability with a decrease in a travel time of the vehicle indicated by the travel data.

For example, when the vehicle is stopped, an offset value which is used for offset correction of the angular velocity sensor is determined. Accordingly, with a decrease in the travel time after the stop, the deviation of the offset value is less likely to occur. As a result, the accuracy of the calculated sensitivity increases with a decrease in the travel time. Hence, by updating the reliability of the sensitivity to a higher reliability with a decrease in the travel time, the reliability can be appropriately updated.

Moreover, it may be that the update processor updates the reliability of the sensitivity to a higher reliability with an increase in a length of a stopped time of the vehicle and in a total number of times the vehicle was stopped, the length of the stopped time and the total number of times the vehicle was stopped being indicated by the travel data.

As described above, when the vehicle is stopped, an offset value which is used for offset correction of the angular velocity sensor is determined. Accordingly, with an increase in the length of the stopped time of the vehicle and in the number of times the vehicle was stopped, the deviation of the offset value is less likely to occur. As a result, with an increase in the length of the stopped time, the accuracy of the calculated sensitivity increases. Hence, by updating the reliability of the sensitivity to a higher reliability with an increase in the length of the stopped time, the reliability can be updated appropriately. In a similar manner, with an increase in the number of times the vehicle was stopped, the accuracy of the calculated sensitivity increases. Hence, by updating the reliability of the sensitivity to a higher reliability with an increase in the number of times the vehicle was stopped, the reliability can be updated appropriately.

Moreover, it may be that when an engine of the vehicle is started, the update processor decreases each reliability indicated in the sensitivity table more significantly with an increase in an elapsed time from when the engine of the vehicle was stopped to when the engine is started.

With an increase in the elapsed time from when the engine was stopped, the sensitivity of the angular velocity sensor is highly likely to have been greatly changed from the sensitivity before the stop. Accordingly, by decreasing each reliability indicated in the sensitivity table more significantly with an increase in the elapsed time from when the engine was stopped, the reliability can be appropriately managed.

Moreover, it may be that in updating the sensitivity associated with the temperature range in the sensitivity table, the update processor: derives a reliability of the calculated sensitivity as a calculated reliability based on the travel data; and derives an updated sensitivity by performing a weighted average on the sensitivity and the calculated sensitivity using a weight that is based on the calculated reliability and a reliability associated with the temperature range in the sensitivity table With this, by using the reliability of the calculated sensitivity and the reliability of the sensitivity indicated in the sensitivity table, the sensitivity can be updated appropriately.

Moreover, it may be that when the target reliability is less than the threshold value, the display prohibits output of the image.

With this, when the target reliability is low, output of an image based on a sensitivity with such a target reliability is prohibited. Hence, it is possible to prevent an inappropriate image from being displayed.

Moreover, it may be that when the target reliability is less than the threshold value, the display changes a display mode of the image, and outputs the image in the display mode after the change.

With this, when the target reliability is low, the display mode of an image is changed. Hence, for example, the augmented reality (AR) display mode can be changed to the non-AR display mode. As a result, it is possible to prevent an inappropriate image from being displayed in the AR display mode.

Hereinafter, an embodiment will be specifically described with reference to the drawings.

The following embodiment describes a general or specific example. The numerical values, shapes, materials, structural elements, the arrangement and connection of the structural elements, steps, order of the steps, etc., shown in the following embodiment are mere examples, and therefore do not limit the present disclosure. Among the structural elements in the following embodiment, those not recited in any of the independent claims which indicate the highest concept are described as optional structural elements.

Note that the figures are schematic illustrations and are not necessarily precise depictions. In the figures, elements that are essentially the same share like reference signs.

Embodiment

FIG. 1 illustrates a usage example of a display device according to the present embodiment.

Display device 100 according to the present embodiment is configured, for example, as a head-up display (HUD), and is provided on vehicle 2. In a specific example, display device 100 is built into dashboard 2b of vehicle 2.

Display device 100 described above projects image light indicating display object 10 that is an image on windshield 2a of vehicle 2. As a result, the image light is reflected by windshield 2a, and travels toward, for example, user 1 who is the driver of vehicle 2. Accordingly, user 1 visually recognizes display object 10 as a virtual image through windshield 2a. In other words, display device 100 causes user 1 to visually recognize display object 10 as a virtual image. In the following description, causing user 1 to visually recognize display object 10 as a virtual image in such a manner is also referred to as display of display object 10, and the operation of projecting the image light is identical in meaning to the operation of displaying display object 10. Windshield 2a is an example of a display medium. In the present embodiment, the display medium is windshield 2a. When vehicle 2 includes a combiner, display device 100 may project image light on the combiner serving as a display medium.

Windshield 2a is a plate-shaped light-transmissive display medium. Accordingly, display device 100 causes user 1 to visually recognize display object 10 as a virtual image while allowing user 1 to look at the background, such as the road surface, through windshield 2a. In other words, windshield 2*a* is capable of displaying display object 10 in the actual background by augmented reality (AR).

Display object 10 is an image which indicates one direction. A specific example of display object 10 is a triangular image. The one direction is the orientation of the tip of the triangle, and is also referred to as a guidance direction. The guidance direction of display object 10 is the direction for guiding vehicle 2 to the destination.

Accordingly, by using display device 100 as described above, the driver, who is user 1, is able to view display object 10 while looking at the outside in front of user 1 without moving the line of sight greatly. Hence, user 1 is able to drive vehicle 2 more safely while recognizing the guidance direction.

Figure 2:
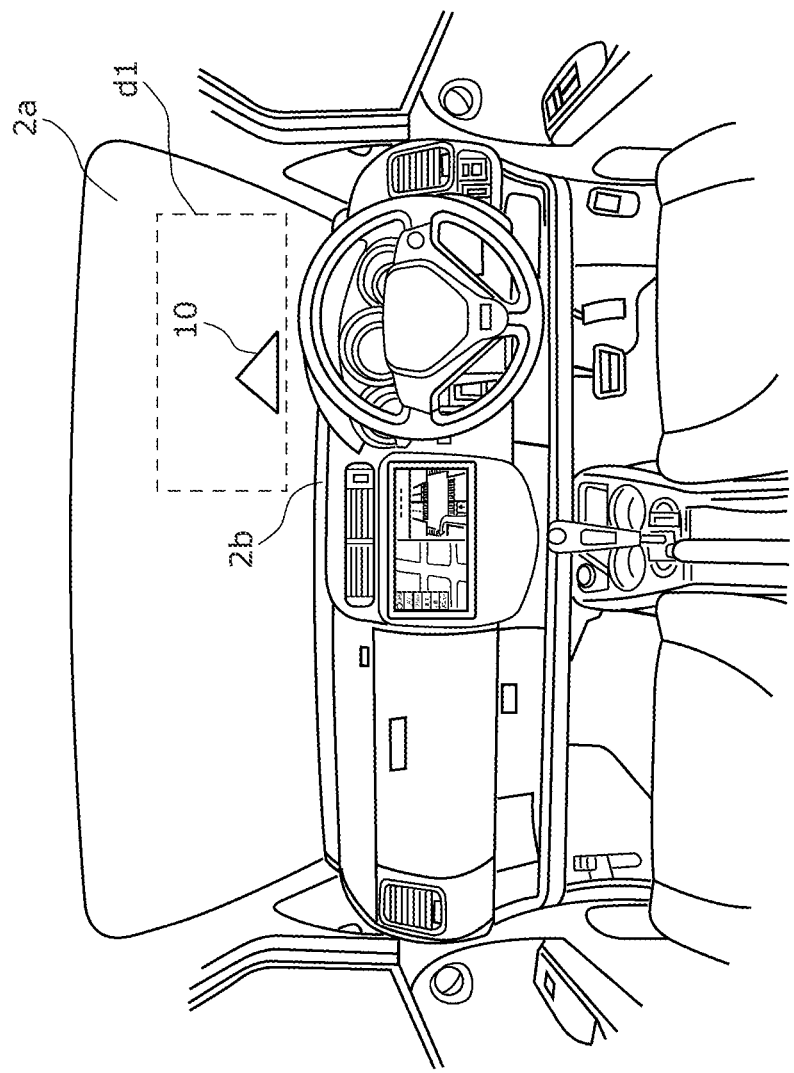
FIG. 2 illustrates an example of an interior of a vehicle which includes the display device according to the embodiment.

FIG. 2 illustrates an example of an interior of vehicle 2 which includes display device 100 according to the present embodiment.

Display device 100 projects image light on windshield 2*a* while being hidden in dashboard 2*b*. By projection of image light performed by display device 100, display object 10 appears as a virtual image within display range d1 on windshield 2*a*.

Figure 3:
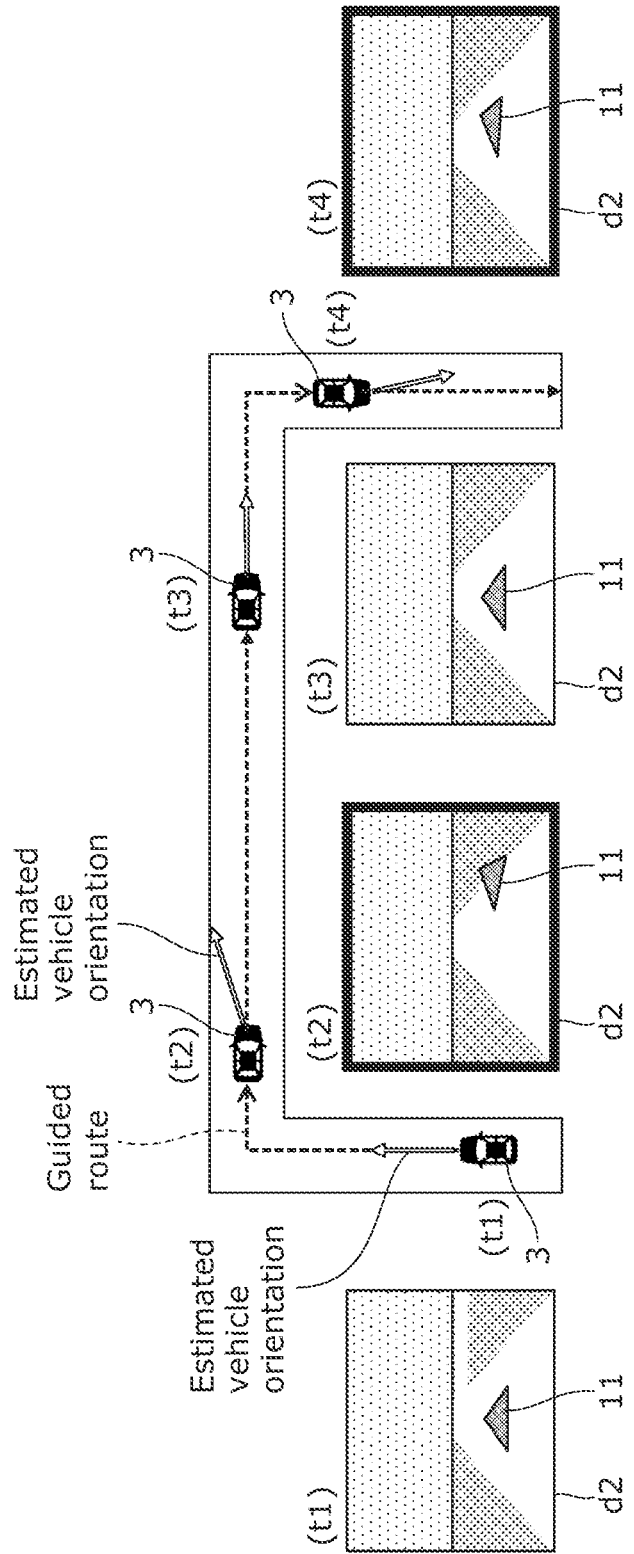
FIG. 3 is a diagram for describing an example of a problem of an image display.

FIG. 3 is a diagram for describing an example of a problem of an image display.

A display device which is to be compared with display device 100 according to the present embodiment is configured as a HUD in a similar manner to display device 100, and is included in vehicle 3. The display device projects, on the windshield of vehicle 3, image light indicating display object 11 that is a triangular image to cause the user to visually recognize display object 11 as a virtual image. In other words, display object 11 appears as a virtual image within display range d2 on the windshield. In other words, the display device displays display object 11 in display range d2.

Here, the display device to be compared with display device 100 estimates the orientation of vehicle 3 as an estimated vehicle orientation using the angular velocity detected by an angular velocity sensor provided on vehicle 3. The display device then determines the guidance direction based on the estimated vehicle orientation, draws display object 11 indicating the guidance direction, and displays drawn display object 11. Here, the sensitivity of the angular velocity of the angular velocity sensor changes depending on the ambient temperature of the angular velocity sensor.

For example, as illustrated in FIG. 3, vehicle 3 travels along the guided route between time t1 and time t4. The guided route is a route derived by a navigation device provided on vehicle 3 for guiding vehicle 3 to the destination.

At time t1, the display device estimates the orientation along the guided route as an estimated vehicle orientation. Accordingly, the display device displays, in display range d2, display object 11 indicating the orientation along the guided route. After time t1, vehicle 3 makes a right turn. Here, when the sensitivity of the angular velocity of the angular velocity sensor changes depending on the change in ambient temperature of the angular velocity sensor, at time t2 that is after vehicle 3 makes a turn, the display device displays display object 11 which indicates the orientation that deviates from the orientation along the guided route. Specifically, the display device might estimate, as the estimated vehicle orientation, the orientation inclined to the left relative to the orientation along the guided route when viewed from vehicle 3. Hence, the display device displays display object 11 which indicates the orientation that deviates to the right relative to the orientation along the guided route when viewed from vehicle 3. In other words, deviation of superimposition of display object 11 occurs.

On the other hand, when vehicle 3 further keeps traveling from time t2 and the travel distance of vehicle 3 reaches a predetermined distance, the display device is capable of reducing the deviation of the estimated vehicle orientation using, for example, the trajectory of the position of vehicle 3 determined by a satellite positioning system. As a result, at time t3, the display device is capable of estimating the orientation along the guided route as an estimated vehicle orientation. Accordingly, the display device is capable of displaying, in display range d2, display object 11 indicating the orientation along the guided route.

However, in a similar manner to the above, when the sensitivity of the angular velocity sensor changes, at time t4 that is after vehicle 3 further turns to the right, the deviation of the orientation indicated by display object 11 occurs again. In other words, the display device estimates, as an estimated vehicle orientation, the orientation inclined to the left relative to the orientation along the guided route when viewed from vehicle 3. As a result, the display device displays display object 11 indicating the orientation that deviates to the right relative to the orientation along the guided route when viewed from vehicle 3. In other words, deviation of superimposition of display object 11 occurs.

Unlike the display device described above, display device 100 according to the present embodiment is capable of reducing the deviation of the orientation indicated by display object 10. In other words, display device 100 is capable of displaying display object 10 which indicates an appropriate orientation while reducing the influence of the ambient temperature of the angular velocity sensor, by performing, on the angular velocity detected by the angular velocity sensor, sensitivity correction in accordance with the ambient temperature of the angular velocity sensor.

Figure 4:
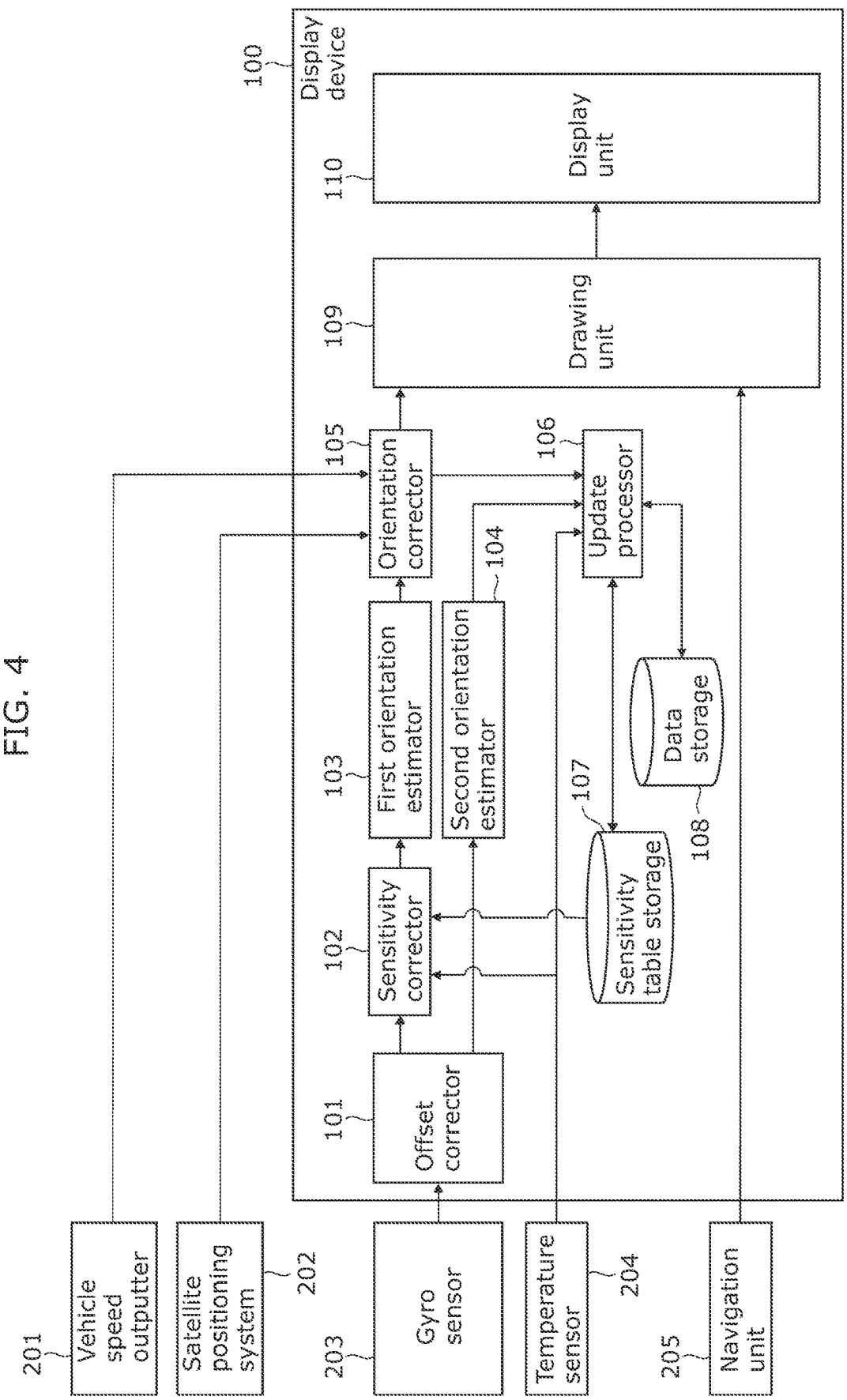
FIG. 4 is a block diagram illustrating a functional configuration of the display device according to the embodiment.

FIG. 4 is a block diagram of a functional configuration of display device 100 according to the present embodiment.

Display device 100 includes offset corrector 101, sensitivity corrector 102, first orientation estimator 103, second orientation estimator 104, orientation corrector 105, update processor 106, sensitivity table storage 107, data storage 108, drawing unit 109, and display unit 110. Such display device 100 obtains signals or information from vehicle speed outputter 201, satellite positioning system 202, gyro sensor 203, temperature sensor 204, and navigation unit 205. Display device 100 then estimates an estimated vehicle orientation based on such signals or information, and displays display object 10 which indicates the orientation that is based on the estimated vehicle orientation.

Vehicle speed outputter 201 is included in, for example, vehicle 2, and outputs vehicle speed information which indicates the vehicle speed that is the speed of vehicle 2. Such vehicle speed outputter 201 is realized by, for example, an electronic control unit (ECU).

Examples of satellite positioning system 202 include global navigation satellite system (GNSS) and global positioning system (GPS). For example, a receiver or the like which receives a signal transmitted from the satellite and is included in satellite positioning system 202 is included in vehicle 2. Such satellite positioning system 202 determines the position and the orientation of vehicle 2, and outputs, to display device 100, position information indicating the position of vehicle 2 and orientation information indicating the orientation of vehicle 2.

Gyro sensor 203 is an example of the angular velocity sensor, detects the angular velocity of the yaw angle of vehicle 2, and outputs an angular velocity signal indicating the detected angular velocity.

Temperature sensor 204 is configured as, for example, a thermistor, and detects the temperature around gyro sensor 203 as ambient temperature, and outputs a temperature signal indicating the detected ambient temperature.

Navigation unit 205, for example, obtains the position information described above from satellite positioning system 202, searches for a route for vehicle 2 to arrive at the destination using map data, and outputs route information indicating the guided route, which is the route obtained by searching, and the position of vehicle 2.

Offset corrector 101 obtains the angular velocity signal from gyro sensor 203, and performs an offset correction on the angular velocity signal. For example, offset corrector 101 performs offset correction by subtracting an offset value from the angular velocity indicated by the angular velocity signal. Offset corrector 101 then outputs the angular velocity signal which has undergone the offset correction to sensitivity corrector 102 and second orientation estimator 104. For example, offset corrector 101 handles, as an offset value, the angular velocity indicated by the angular velocity signal output from gyro sensor 203 while vehicle 2 is stopped. Specifically, offset corrector 101 determines, based on the vehicle speed information output from vehicle speed outputter 201, whether or not the vehicle speed during the past three seconds is 0 and the amount of change in the acceleration of vehicle 2 is less than or equal to a threshold value. Offset corrector 101 may obtain the acceleration of vehicle 2 from an acceleration sensor provided on vehicle 2. When offset corrector 101 determines that the vehicle speed is 0 and the amount of change in the acceleration is less than or equal to the threshold value, offset corrector 101 determines that vehicle 2 is in a stopped state and handles, as an offset value, the average value of the angular velocities indicated by the angular velocity signals output from gyro sensor 203 during the past three seconds.

Sensitivity corrector 102 obtains, from offset corrector 101, the angular velocity signal which has undergone the offset correction. Sensitivity corrector 102 then performs sensitivity correction on the angular velocity indicated by the angular velocity signal, that is, the angular velocity which has undergone the offset correction. In the sensitivity correction, sensitivity corrector 102 obtains a temperature signal from temperature sensor 204. Sensitivity corrector 102 further obtains, from sensitivity table storage 107, the sensitivity associated with the temperature range including the ambient temperature indicated by the temperature signal. Sensitivity corrector 102 then corrects the angular velocity in accordance with the sensitivity. For example, sensitivity corrector 102 corrects the angular velocity by multiplying the angular velocity by the sensitivity. Sensitivity corrector 102 outputs, to first orientation estimator 103, the angular velocity signal indicating the angular velocity which has undergone the sensitivity correction.

In other words, sensitivity corrector 102 according to the present embodiment obtains the ambient temperature, detected by temperature sensor 204, of gyro sensor 203 provided on vehicle 2, obtains, from sensitivity table storage 107, the sensitivity of gyro sensor 203 associated with the temperature range including the ambient temperature, and corrects the angular velocity, which has been detected by gyro sensor 203 and which has undergone the offset correction, in accordance with the obtained sensitivity.

First orientation estimator 103 obtains the angular velocity signal from sensitivity corrector 102. The angular velocity signal indicates the angular velocity which has undergone the offset correction and the sensitivity correction. First orientation estimator 103 estimates the orientation that vehicle 2 faces as a first estimated vehicle orientation by a sum of the angular velocities. The sum of the angular velocities is time integration of the angular velocity. First orientation estimator 103 outputs, to orientation corrector 105, first estimated orientation information indicating the first estimated vehicle orientation.

In such a manner, first orientation estimator 103 according to the present embodiment estimates the orientation that vehicle 2 faces as the first estimated vehicle orientation based on the angular velocity which has been corrected by sensitivity corrector 102.

Second orientation estimator 104 obtains an angular velocity signal from offset corrector 101. The angular velocity signal indicates the angular velocity which has not undergone sensitivity correction. Second orientation estimator 104 estimates the orientation that vehicle 2 faces as a second estimated vehicle orientation by a sum of the angular velocities which have undergone the offset correction and have not undergone sensitivity correction. Second orientation estimator 104 outputs, to update processor 106, second estimated orientation information indicating the second estimated vehicle orientation.

In such a manner, second orientation estimator 104 according to the present embodiment estimates the orientation that vehicle 2 faces as the second estimated vehicle orientation based on the angular velocity which has been detected by gyro sensor 203 and which has not undergone the sensitivity correction.

Orientation corrector 105 obtains the first estimated orientation information from first orientation estimator 103, and derives a third estimated vehicle orientation by correcting the first estimated vehicle orientation indicated by the first estimated orientation information. Specifically, orientation corrector 105 derives the third estimated vehicle orientation by correcting the first estimated vehicle orientation to the relative orientation with respect to the initial orientation. The initial orientation is, for example, the orientation of vehicle 2 indicated by the orientation information output from satellite positioning system 202. This orientation includes errors. In other words, deviation of the orientation is included. In view of the above, orientation corrector 105 estimates the deviation of the orientation every time a predetermined condition is satisfied, and updates the initial orientation so as to reduce the deviation. Orientation corrector 105 then outputs third estimated orientation information indicating the derived third estimated vehicle orientation to update processor 106 and drawing unit 109.

Orientation corrector 105 estimates the deviation of the orientation as described above. Specifically, orientation corrector 105 obtains not only the first estimated orientation information but also the vehicle speed information from vehicle speed outputter 201, and obtains position information and orientation information from satellite positioning system 202. Orientation corrector 105 performs dead reckoning using the first estimated vehicle orientation indicated by the first estimated orientation information, the initial orientation indicated by, for example, the orientation information, and the vehicle speed indicated by the vehicle speed information. Orientation corrector 105 derives the travel trajectory of vehicle 2 by the dead reckoning. Orientation corrector 105 further derives the travel trajectory of vehicle 2 based on the position of vehicle 2 indicated by the position information. Orientation corrector 105 estimates the deviation of the orientation based on the deviation of such travel trajectories. Orientation corrector 105 then updates the initial orientation by reflecting the deviation of the orientation to the initial orientation, that is, for example, by adding or subtracting the deviation of the orientation to or from the initial orientation, and corrects the first estimated vehicle orientation to the relative orientation with respect to the initial orientation. With this, the third estimated vehicle orientation is derived.

In order to increase the accuracy of the estimation of the deviation of the orientation, the deviation of the orientation is estimated, for example, every time the condition in which vehicle 2 has traveled at least a predetermined distance is satisfied. Accordingly, when vehicle 2 has not traveled at least the predetermined distance, the third estimated vehicle orientation is derived based on the deviation of the orientation estimated immediately before.

In such a manner, orientation corrector 105 according to the present embodiment derives the third estimated vehicle orientation by correcting the first estimated vehicle orientation using at least the position of vehicle 2 determined by satellite positioning system 202 and the vehicle speed of vehicle 2.

Update processor 106 obtains a temperature signal from temperature sensor 204, obtains the second estimated orientation information from second orientation estimator 104, and obtains the third estimated orientation information from orientation corrector 105. In other words, update processor 106 obtains the ambient temperature of gyro sensor 203 and the second estimated vehicle orientation and the third estimated vehicle orientation estimated or derived at the ambient temperature. Update processor 106 then updates a sensitivity table stored in sensitivity table storage 107 using the ambient temperature, the second estimated vehicle orientation and the third estimated vehicle orientation. The sensitivity table indicates sensitivities of gyro sensor 203 each associated with a different one of a plurality of temperature ranges which are mutually different.

Specifically, update processor 106 first generates or updates travel history data. The travel history data indicates, for example, the second estimated vehicle orientations, the third estimated vehicle orientations, and the ambient temperatures obtained at different timings in association with each other. Moreover, update processor 106 calculates the sensitivity of gyro sensor 203 corresponding to each ambient temperature based on the generated or updated travel history data. In other words, update processor 106 calculates the sensitivity of gyro sensor 203 based on two second estimated vehicle orientations and two third estimated vehicle orientations which are associated with substantially the same ambient temperature indicated in the travel history data. The ambient temperatures which are substantially the same may be the same ambient temperature, the ambient temperatures within a few percent error range, the ambient temperatures within a predetermined range, or the ambient temperatures within the same temperature range in the temperature ranges described above.

Update processor 106 then generates or updates, for each detected ambient temperature, sensitivity history data indicating the sensitivity of gyro sensor 203 calculated for the ambient temperature. When updating the sensitivity table, update processor 106 calculates the average value of the sensitivities associated with the respective temperatures in the same temperature range indicated in the sensitivity history data. Update processor 106 then updates the sensitivity associated with the temperature range described above in the sensitivity table by replacing the sensitivity with the calculated average value. In other words, update processor 106 performs calibration on the sensitivity.

In such a manner, update processor 106 according to the present embodiment calculates, as a calculated sensitivity, the sensitivity of gyro sensor 203 based on the second estimated vehicle orientation estimated by second orientation estimator 104 and the third estimated vehicle orientation derived by orientation corrector 105, and updates the sensitivity stored in sensitivity table storage 107 in association with the temperature range, using the calculated sensitivity. The temperature range includes the ambient temperature detected by temperature sensor 204 when the second estimated vehicle orientation and the third estimated vehicle orientation are estimated or derived.

Sensitivity table storage 107 is a recording medium for storing the sensitivity table. Data storage 108 is a recording medium for storing travel history data and sensitivity history data for updating the sensitivity table. Such recording mediums are, for example, a hard disk drive, a random access memory (RAM), a read only memory (ROM), or a semiconductor memory. Such recording mediums may be volatile or non-volatile.

Drawing unit 109 obtains the third estimated orientation information from orientation corrector 105, and generates display object 10 indicating the orientation that is based on the third estimated vehicle orientation indicated by the third estimated orientation information. In other words, drawing unit 109 draws display object 10. Drawing unit 109 obtains route information from navigation unit 205 when drawing display object 10. Drawing unit 109 then identifies the orientation along the guided route at the position of vehicle 2 based on the route information, and draws display object 10 having a shape inclined to the orientation along the guided route relative to the third estimated vehicle orientation, that is, draws display object 10 indicating the orientation from the third estimated vehicle orientation toward the guided route. Drawing unit 109 outputs an image signal indicating display object 10 thus drawn to display unit 110.

Display unit 110 obtains the image signal from drawing unit 109 and displays display object 10 in accordance with the image signal. For example, display unit 110 includes a light source and an optical system, and generates image light indicating display object 10 in such a manner that display object 10 is visually recognized by user 1. Display unit 110 projects the image light on windshield 2a. As a result, display object 10 is visually recognized by user 1. In other words, display unit 110 projects image light indicating display object on windshield 2a to cause windshield 2a to reflect the image light toward user 1 of vehicle 2, so that user 1 visually recognizes display object 10 as a virtual image through windshield 2a.

In such a manner, display unit 110 according to the present embodiment displays display object 10 that is an image in accordance with the third estimated vehicle orientation.

Figure 5:
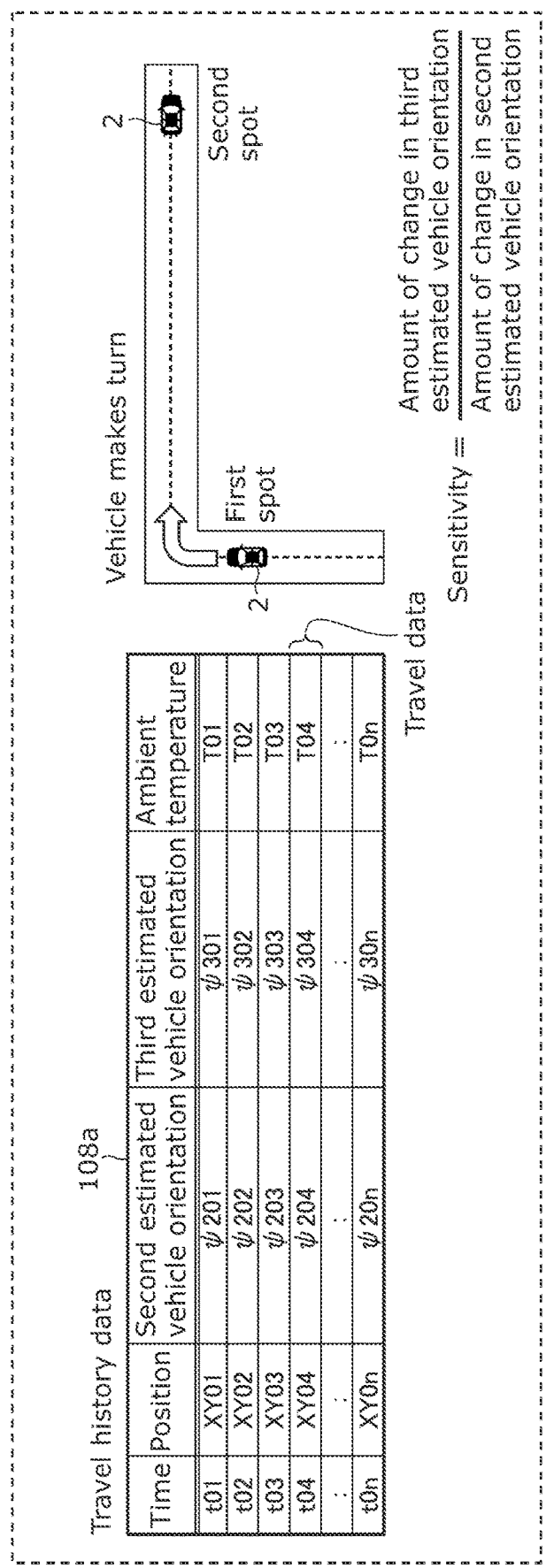
FIG. 5 is a diagram for describing calculation of a sensitivity according to the embodiment.

FIG. 5 is a diagram for describing calculation of a sensitivity.

Update processor 106 generates or updates travel history data 108a, for example, illustrated in FIG. 5. Specifically, as described above, update processor 106 obtains the ambient temperature of gyro sensor 203 and the second estimated vehicle orientation and the third estimated vehicle orientation estimated or derived at the ambient temperature. Update processor 106 further obtains the position information from satellite positioning system 202. Update processor 106 associates the position indicated by the position information, the ambient temperature detected at the position, and the second estimated vehicle orientation and the third estimated vehicle orientation estimated or derived at the ambient temperature, with the time at which vehicle 2 passed the position. In such a manner, travel data is generated. When travel history data 108a is not stored in data storage 108, update processor 106 generates the travel data as travel history data 108a, and stores the data in data storage 108. On the other hand, when travel history data 108a is stored in data storage 108, update processor 106 updates travel history data 108a by adding the latest travel data to travel history data 108a which has been already stored.

Next, update processor 106 calculates the sensitivity of gyro sensor 203 using travel history data 108a. For example, update processor 106 searches travel history data 108a for two second estimated vehicle orientations and two third estimated vehicle orientations associated with substantially the same ambient temperature. In a specific example, when ambient temperature "T01" and ambient temperature "T02" are substantially the same temperature, update processor 106 finds second estimated vehicle orientations "Ψ201" and "Ψ202" and third estimated vehicle orientations "Ψ301" and "Ψ302". Next, update processor 106 calculates the amount of change between third estimated vehicle orientations "Ψ301" and "Ψ302" that is "Ψ302-Ψ301". In a similar manner, update processor 106 calculates the amount of change between second estimated vehicle orientations "Ψ201" and "Ψ202" that is "Ψ202-Ψ201". Update processor 106 then calculates the sensitivity of gyro sensor 203 by dividing the amount of change between the third estimated vehicle orientations "Ψ302-Ψ301" by the amount of change between the second estimated vehicle orientations "Ψ202-Ψ201".

Here, update processor 106 may calculate the sensitivity using the second estimated vehicle orientations and the third estimated vehicle orientations associated in travel history data 108a with the positions where vehicle 2 passed before and after making a turn. For example, vehicle 2 makes a right turn after passing a first spot at time "t03" and passes a second spot at time "t04". Here, in travel history data 108a, each of the second estimated vehicle orientation and the third estimated vehicle orientation changes by approximately 90° C. between time "t03" and time "t04". Moreover, ambient temperature "T03" at time "t03" and ambient temperature "T04" at time "t04" are substantially the same, and the ambient temperature does not change between time "t03" and time "t04". In this case, update processor 106 calculates the sensitivity using second estimated vehicle orientation "Ψ203" and third estimated vehicle orientation "Ψ303" which are associated with time "t03" and second estimated vehicle orientation "Ψ204" and third estimated vehicle orientation "Ψ304" which are associated with time "t04".

In such a manner, when vehicle 2 makes a turn after passing the first spot and passes the second spot, update processor 106 calculates the sensitivity based on the amount of change between the second estimated vehicle orientations estimated at the first spot and the second spot and the amount of change between the third estimated vehicle orientations derived at the first spot and the second spot. With this, a calculated sensitivity is calculated based on the amount of change made when vehicle 2 made a turn. In other words, a calculated sensitivity is calculated when the orientation of vehicle 2 is greatly changed. Hence, the accuracy of the calculated sensitivity can be increased. As a result, the sensitivity associated with each temperature range in sensitivity table storage 107 (that is the sensitivity table) can be appropriately updated.

Here, for example, with an increase in the amount of change in the second estimated vehicle orientation and with an increase in the amount of change in the third estimated vehicle orientation, update processor 106 may use, with a higher priority, the second estimated vehicle orientation and the third estimated vehicle orientation corresponding to the amount of changes for calculating the sensitivity. In other words, with an increase in the angle of the turn made by vehicle 2, update processor 106 may calculate the sensitivity using, with a higher priority, the second estimated vehicle orientations and the third estimated vehicle orientations associated with the two positions where vehicle 2 passed before and after making a turn. Moreover, as the traveling of vehicle 2 before and after the turn is closer to the straight travel and the travel distance at that time is longer, update processor 106 may calculate the sensitivity using, with a higher priority, the second estimated vehicle orientations and the third estimated vehicle orientations associated with the two positions where vehicle 2 passed before and after making the turn. With this, the accuracy of the calculated sensitivity can be further increased. As the amount of change in the second estimated vehicle orientation or the third estimated vehicle orientation decreases, update processor 106 may determine that the travel of vehicle 2 is closer to the straight travel, and derive the travel distance of vehicle 2 based on the position indicated by the position information output from satellite positioning system 202 as needed.

The travel data included in travel history data 108a illustrated in FIG. 5 may further indicate the first estimated vehicle orientation, and the travel distance. Moreover, the travel data may at least indicate the second estimated vehicle orientation, the third estimated vehicle orientation, and the ambient temperature, and does not have to indicate the time and the position.

FIG. 6 illustrates an example of updating of the sensitivity table according to the embodiment.

As illustrated in FIG. 5, when update processor 106 calculates the sensitivity of gyro sensor 203 corresponding to the ambient temperature using travel history data 108a, update processor 106 associates the sensitivity with the ambient temperature. Subsequently, as illustrated in FIG. 6, update processor 106 generates sensitivity history data 108b indicating the associated sensitivity and ambient temperature. In other words, when sensitivity history data 108b has not yet been stored in data storage 108, update processor 106 generates sensitivity history data 108b indicating the associated sensitivity and ambient temperature, and stores sensitivity history data 108b in data storage 108. On the other hand, when sensitivity history data 108b has already been stored in data storage 108, update processor 106 adds the associated sensitivity and ambient temperature to sensitivity history data 108b. In such a manner, sensitivity history data 108b is updated. Sensitivity history data 108b illustrated in FIG. 6 indicates sensitivities (that is calculated sensitivities) by "Gn0, Gn1, Gn2", and the like.

Update processor 106 updates sensitivity table 107a illustrated in FIG. 6 by calculating the average value of the sensitivities indicated by sensitivity history data 108b. For example, sensitivity table 107a indicates a plurality of temperature ranges and the initial value of the sensitivity for each of the temperature ranges in advance. As illustrated in FIG. 6, the temperature ranges are, for example, "−40 to −30° C." "−30 to −20° C.", and "−20 to −10° C.". The initial value may be a predetermined sensitivity (for example, 1) or may be a sensitivity calculated immediately before. The temperature ranges illustrated in FIG. 6 are examples. The temperature ranges according to the present disclosure are not limited to such examples, and may be any temperature ranges. The temperature range "a to b ° C." indicated using values a and b may mean "at least a ° C. and less than b ° C." or "greater than a ° C. and at most b ° C.".

Update processor 106 calculates, for each of the temperature ranges, the average value of the sensitivities associated with one or more ambient temperatures in the temperature range in sensitivity history data 108b. Update processor 106 then updates sensitivity table 107a by replacing, for each of the temperature ranges, the sensitivity associated with the temperature range in sensitivity table 107a with the average value calculated for the temperature range. Moreover, every time a new set of an ambient temperature and a sensitivity is added to sensitivity history data 108b, update processor 106 may update the sensitivity of the temperature range including the ambient temperature indicated in sensitivity table 107a in the manner described above. Sensitivity table 107a illustrated in FIG. 6 indicates each sensitivity (that is the average value of the calculated sensitivities) by "G0, G1, G2" and the like.

Sensitivity corrector 102 obtains, from sensitivity table storage 107, the sensitivity in sensitivity table 107a associated with the temperature range including the ambient temperature detected by temperature sensor 204, and uses the obtained sensitivity to correct the angular velocity (that is sensitivity correction). With this, for each temperature range, the angular velocity is corrected using sensitivity table 107a indicating the sensitivity of gyro sensor 203 for the temperature range. Accordingly, with an increase in the number of the temperature ranges, angular velocity correction can be more precisely performed for a wider range of ambient temperatures.

Figure 7:
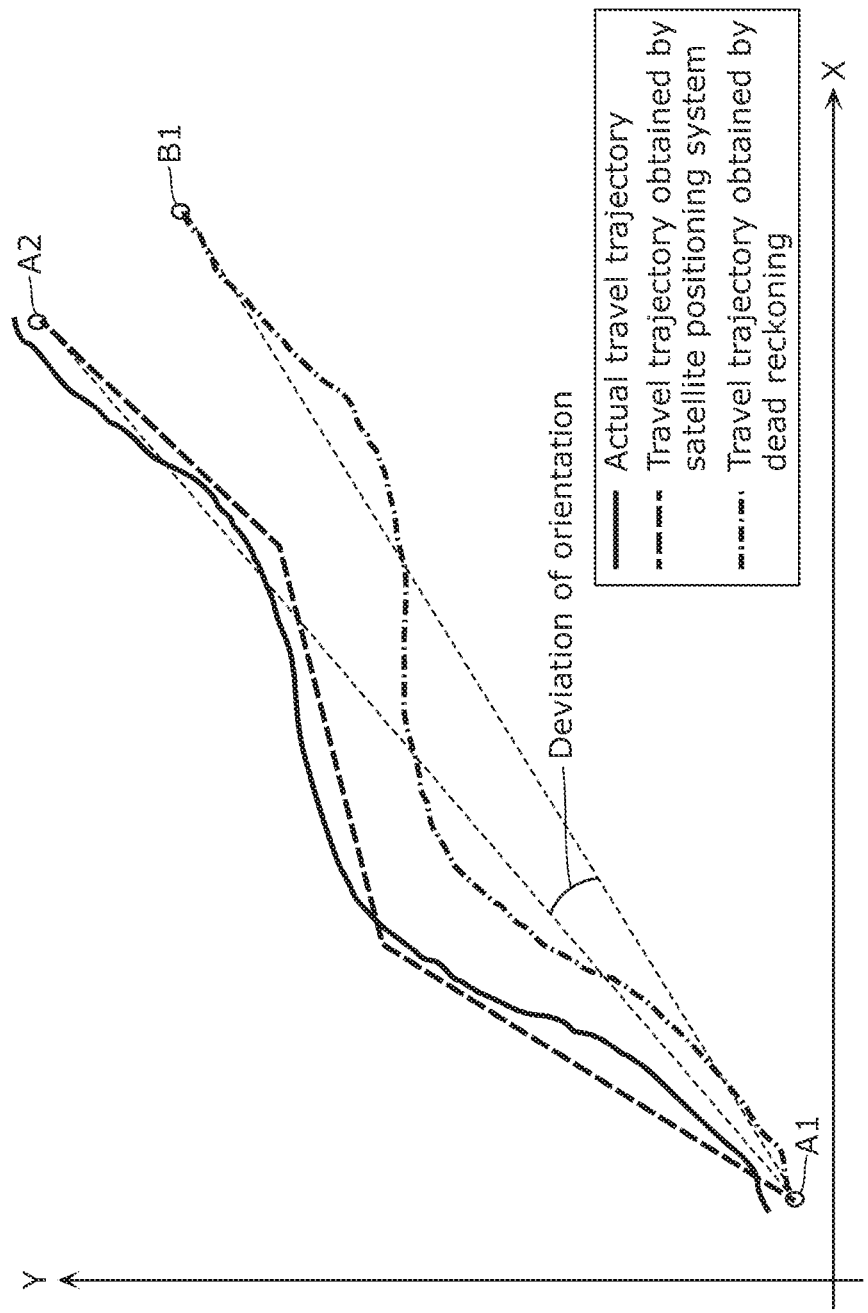
FIG. 7 is a diagram for describing orientation correction performed by an orientation corrector according to the embodiment.

FIG. 7 is a diagram for describing orientation correction performed by orientation corrector 105. Specifically, FIG. 7 schematically illustrates an example of travel trajectory of vehicle 2 on the horizontal plane defined by X-Y coordinate system. For example, vehicle 2 moves from the lower left side (that is, the origin point on the X-Y coordinates) to the upper right side (that is the positive y-axis and x-axis) on the horizontal plane. The solid line in FIG. 7 indicates the actual travel trajectory of vehicle 2. Although the actual travel history is not recognized by orientation corrector 105 and the like, the actual travel history is illustrated for comparison with the travel trajectory obtained by satellite positioning system 202 and the travel trajectory obtained by dead reckoning. The dashed line in FIG. 7 indicates the travel trajectory obtained by satellite positioning system 202, and the dashed dotted line in FIG. 7 indicates the travel trajectory obtained by dead reckoning.

Orientation corrector 105 obtains the position information output from satellite positioning system 202 as needed, and identifies the travel trajectory from position A1 to position A2 obtained by satellite positioning system 202 based on the positions indicated by the position information. Orientation corrector 105 further obtains first estimated orientation information output from first orientation estimator 103 as needed, and obtains vehicle speed information output from vehicle speed outputter 201 as needed. Orientation corrector 105 then performs dead reckoning with position A1 as the origin point. In other words, orientation corrector 105 performs dead reckoning based on position A1, the initial orientation when position A1 was determined, the first estimated vehicle orientation indicated by the first estimated orientation information, and the vehicle speed indicated by the vehicle speed information. Accordingly, the travel trajectory obtained by dead reckoning from position A1 to position B1 is identified. Position B1 is the position estimated by dead reckoning when position A2 was determined.

Next, orientation corrector 105 estimates, as the deviation of orientation, the angle formed by a straight line connecting position A1 and position A2 and a straight line connecting position A1 and position B1. Orientation corrector 105 then adds the deviation (that is the angle formed) to the initial orientation or subtracts the deviation from the initial orientation to update the initial orientation, and corrects the first estimated vehicle orientation to the relative orientation with respect to the initial orientation. With such a correction, the third estimated vehicle orientation is derived.

In such a manner, orientation corrector 105 according to the present embodiment estimates the deviation of the orientation of vehicle 2, and corrects the first estimated vehicle orientation in accordance with the orientation of vehicle 2. In other words, orientation corrector 105 estimates the deviation of the orientation of vehicle 2 based on (a) the first position of vehicle 2 determined by satellite positioning system 202, (b) the second position of vehicle 2 determined by satellite positioning system 202 when vehicle 2 moves from the first position, (c) the estimated position of vehicle 2 estimated based on dead reckoning when the second position is determined. The dead reckoning is performed using the first position, the orientation of vehicle 2 at the first position (that is, the initial orientation), the angular velocity detected by gyro sensor 203, and the speed of vehicle 2. Moreover, orientation corrector 105 estimates, as the deviation of the orientation of vehicle 2, the angle formed by a straight line connecting the first position and the second position and a straight line connecting the first position and the estimated position. With this, the travel trajectory is obtained by satellite positioning system 202 from the first position and the second position, and the travel trajectory is obtained by dead reckoning from the first position and the estimated position. The deviation of the orientation of vehicle 2 is then estimated based on such travel trajectories, and the first estimated vehicle orientation is corrected in accordance with the deviation of the orientation. Accordingly, the deviation of the orientation can be reduced, and the third estimated vehicle orientation can be derived as an accurate orientation of vehicle 2.

Figure 8:
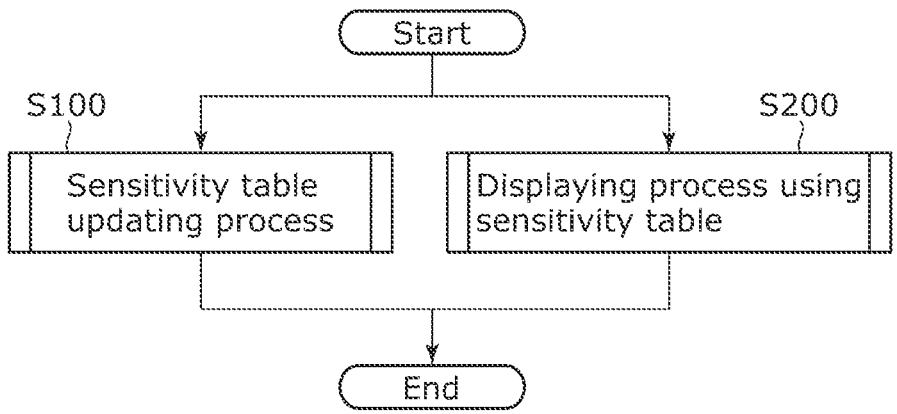
FIG. 8 is a flowchart illustrating an overall process performed by the display device according to the embodiment.

FIG. 8 is a flowchart illustrating an overall process performed by display device 100.

Display device 100 performs a sensitivity table updating process (step S100) and a display process using sensitivity table 107a (step S200). The sensitivity table updating process is a process of updating sensitivity table 107a stored in sensitivity table storage 107. The display process using sensitivity table 107a is a process of further correcting the angular velocity, which has undergone the offset correction, using a sensitivity indicated in sensitivity table 107a, and displaying display object 10 based on the corrected angular velocity. Such a sensitivity table updating process and the display process using sensitivity table 107a may be performed in parallel or in series.

Figure 9:
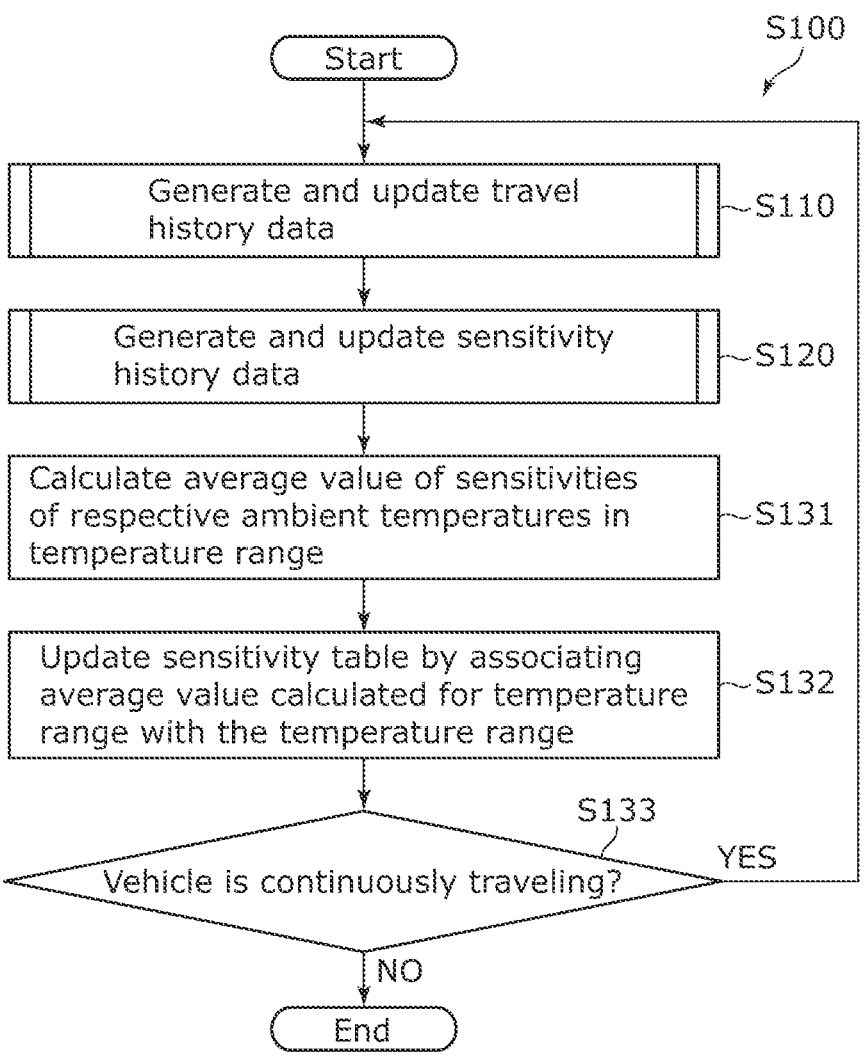
FIG. 9 is a flowchart illustrating an example of a schematic process of updating the sensitivity table according to the embodiment.

FIG. 9 is a flowchart illustrating an example of a schematic process of updating the sensitivity table. In other words, the flowchart in FIG. 9 illustrates the details of step S100 in FIG. 8.

First, update processor 106 generates or updates travel history data 108a (step S110). In other words, the process of generating and updating travel history data 108a is performed. Next, update processor 106 generates or updates sensitivity history data 108b using travel history data 108a (step S120). In other words, the process of generating and updating sensitivity history data 108b is performed.

Next, when a new sensitivity is added to sensitivity history data 108b in association with an ambient temperature in step S120, update processor 106 identifies the temperature range including the ambient temperature from sensitivity table 107a. Update processor 106 then calculates the average value of the sensitivities associated with the respective ambient temperatures in the temperature range in sensitivity history data 108b (step S131). Next, update processor 106 updates sensitivity table 107a by associating the average value calculated for the temperature range with the temperature range (step S132). When a sensitivity has already been associated with the temperature range in sensitivity table 107a, update processor 106 replaces the existing sensitivity with the average value.

Update processor 106 then determines whether or not vehicle 2 is continuously traveling (step S133). Here, when determining that vehicle 2 is continuously traveling (YES in step S133), update processor 106 repeatedly performs processes from step S110. On the other hand, when determining that vehicle 2 is not continuously traveling (NO in step S133), update processor 106 ends the sensitivity table updating process.

Figure 10:
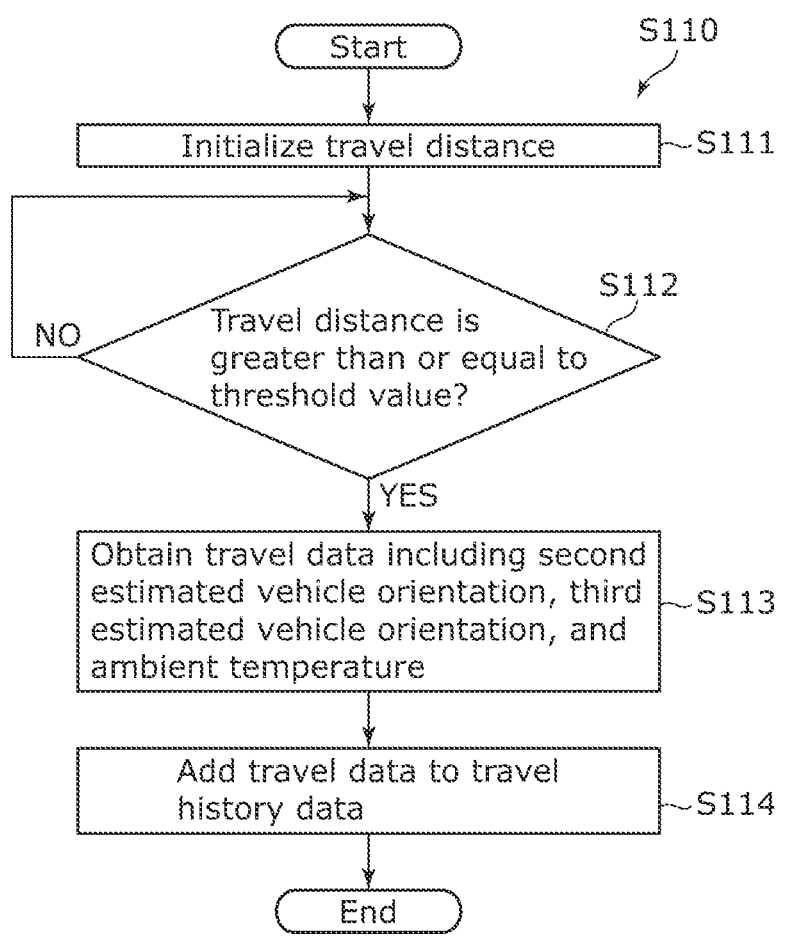
FIG. 10 is a flowchart illustrating an example of a process of generating and updating travel history data according to the embodiment.

FIG. 10 is a flowchart illustrating one example of a process of generating and updating sensitivity history data 108a. In other words, the flowchart in FIG. 10 illustrates the details of step S110 in FIG. 9.

First, update processor 106 initializes the travel distance of vehicle 2 (step S111). For example, update processor 106 sets 0 to the travel distance. Update processor 106 then determines whether or not the travel distance of vehicle 2 has reached at least a predetermined threshold (step S112). For example, update processor 106 may obtain information indicating the travel distance from an external apparatus of display device 100, or identify the travel distance based on the position information output from satellite positioning system 202. The threshold value of the travel distance is, for example, 10 m. Here, when determining that the travel distance has not reached at least the threshold value (NO in step S112), update processor 106 repeatedly performs step S112.

On the other hand, when determining that the travel distance has reached at least the threshold value (YES in step S112), update processor 106 obtains second estimated orientation information from second orientation estimator 104, obtains third estimated orientation information from orientation corrector 105, and obtains a temperature signal from temperature sensor 204. In other words, update processor 106 obtains travel data which includes the second estimated vehicle orientation indicated by the second estimated orientation information, the third estimated vehicle orientation indicated by the third estimated orientation information, and the ambient temperature indicated by the temperature signal (step S113). Here, update processor 106 may obtain the position information from satellite positioning system 202, and include, in the travel data, the position of vehicle 2 indicated by the position information. Moreover, update processor 106 may further include, in the travel data, the time at which the second estimated vehicle orientation and the like was obtained.

Update processor 106 then updates travel history data 108a by adding the travel data to travel history data 108a stored in data storage 108 (step S114). When travel history data 108a is not stored in data storage 108, update processor 106 generates the travel data as travel history data 108a, and stores the data in data storage 108.

Figure 11:
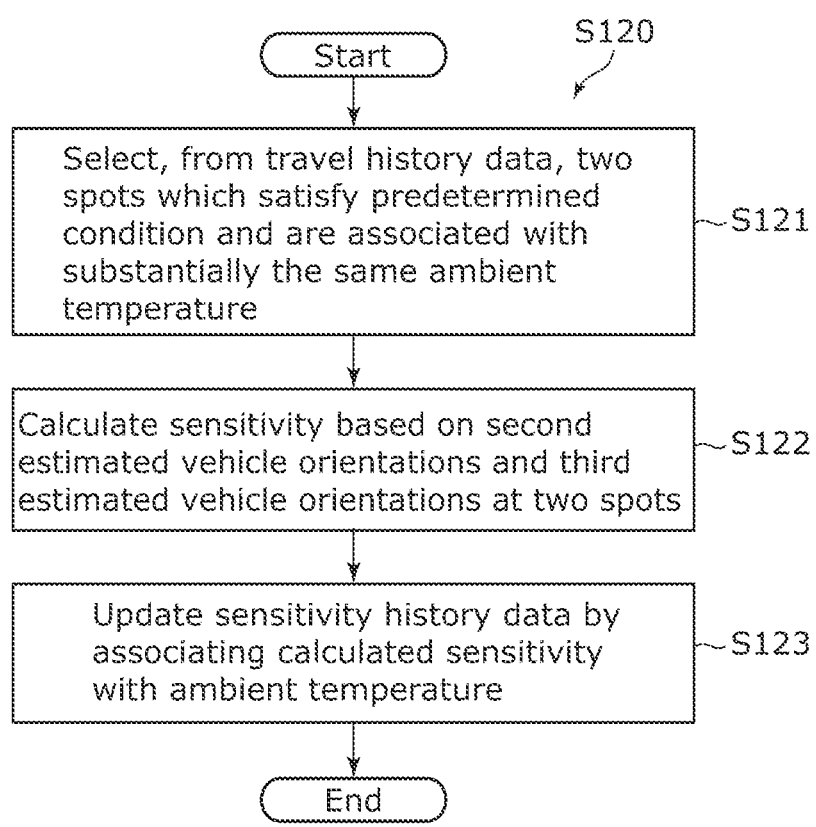
FIG. 11 is a flowchart illustrating an example of a process of generating and updating sensitivity history data according to the embodiment.

FIG. 11 is a flowchart illustrating an example of a process of generating and updating sensitivity history data 108b. In other words, the flowchart in FIG. 11 illustrates the details of step S120 in FIG. 9.

First, update processor 106 obtains, from travel history data 108a updated in step S110, two items of travel data including the ambient temperatures which are substantially the same. At this time, update processor 106 obtains, for example, two items of travel data which satisfy a predetermined condition that the travel data was obtained before and after vehicle 2 made a turn. In other words, as illustrated in FIG. 5, when the travel data includes positions, update processor 106 selects two spots which are associated with substantially the same ambient temperature and satisfy the predetermined condition (step S121).

Next, update processor 106 calculates the sensitivity of gyro sensor 203 for the ambient temperature described above based on the second estimated vehicle orientations and the third estimated vehicle orientations obtained at the two spots and indicated by travel history data 108a (step S122).

Update processor 106 then updates sensitivity history data 108b by adding, to sensitivity history data 108b stored in data storage 108, the sensitivity calculated in step S122 in association with the ambient temperature (step S123). When sensitivity history data 108b is not stored in data storage 108, update processor 106 generates data including the calculated sensitivity and the ambient temperature as sensitivity history data 108b, and stores the generated data in data storage 108.

Figure 12:
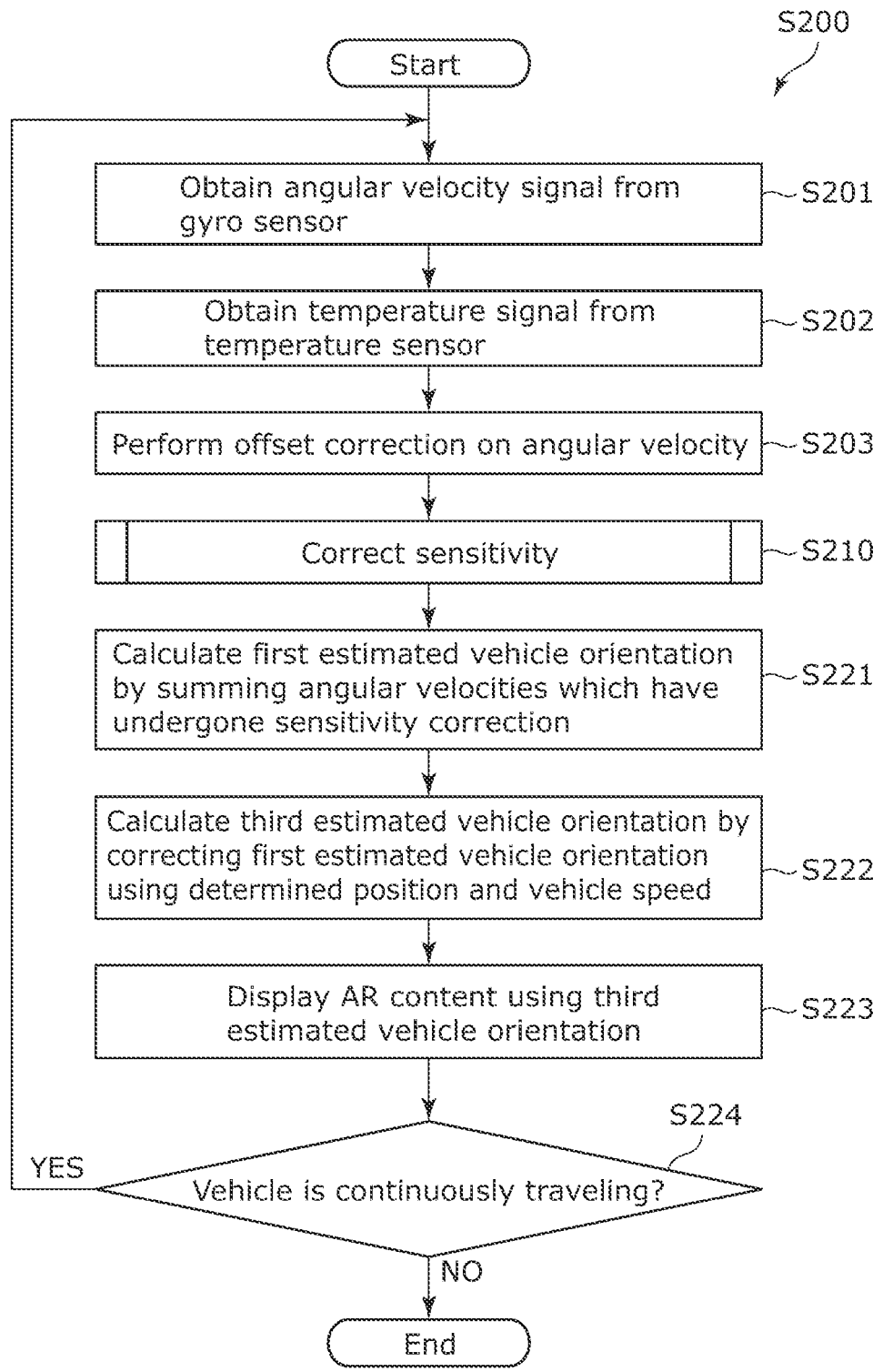
FIG. 12 is a flowchart illustrating an example of a display process using the sensitivity table according to the embodiment.

FIG. 12 is a flowchart illustrating an example of a display process using sensitivity table 107a. In other words, the flowchart in FIG. 12 illustrates the details of step S200 in FIG. 8.

First, offset corrector 101 obtains an angular velocity signal from gyro sensor 203 (step S201), and sensitivity corrector 102 obtains a temperature signal from temperature sensor 204 (step S202). Next, offset corrector 101 performs offset correction on the angular velocity indicated by the angular velocity signal obtained in step S201 (step S203). Subsequently, sensitivity corrector 102 performs sensitivity correction on the angular velocity, which has undergone the offset correction in step S203, using sensitivity table 107a stored in sensitivity table storage 107 (step S210). Here, the ambient temperature of gyro sensor 203 indicated by the temperature signal obtained in step S202 is used for the sensitivity correction. In other words, in step S210, the sensitivity correction process using the ambient temperature is performed.

Next, first orientation estimator 103 calculates a first estimated vehicle orientation. In other words, first orientation estimator 103 calculates the first estimated vehicle orientation by summing the angular velocities which have undergone the sensitivity correction in step S210 (step S221). Orientation corrector 105 then corrects the first estimated vehicle orientation calculated in step S221 using the position of vehicle 2 determined by satellite positioning system 202 and the vehicle speed indicated by the vehicle speed information output from vehicle speed outputter 201 (step S222). A third estimated vehicle orientation is derived or calculated by the correction in step S222.

Next, drawing unit 109 draws display object 10 which is AR content using the route information output from navigation unit 205 and the third estimated vehicle orientation calculated in step S222. Display unit 110 displays display object 10 by projecting image light indicating display object 10 on windshield 2a (step S223).

Display device 100 then determines whether or not vehicle 2 is continuously traveling (step S224). Here, when determining that vehicle 2 is continuously traveling (YES in step S224), display device 100 repeatedly performs processes from step S201. On the other hand, when determining that vehicle 2 is not continuously traveling (NO in step S224), display device 100 ends the display process using sensitivity table 107a.

Figures 13, 14:
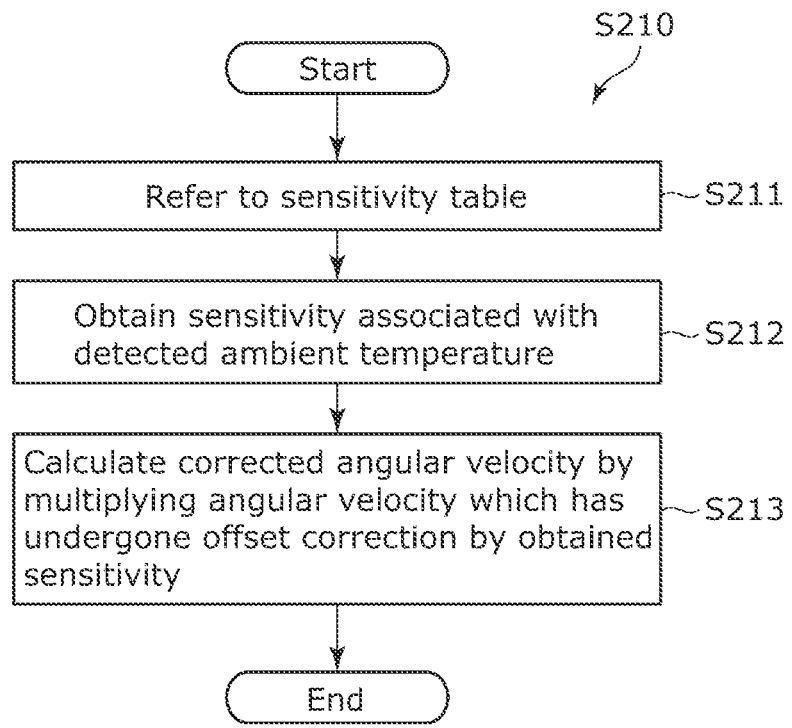
FIG. 13 is a flowchart illustrating an example of a process of correcting a sensitivity according to the embodiment.
FIG. 14 illustrates an example of updating of a sensitivity table according to Variation 1 of the embodiment.

FIG. 13 is a flowchart illustrating an example of a process of correcting a sensitivity. In other words, the flowchart in FIG. 13 illustrates the details of step S210 in FIG. 12.

First, sensitivity corrector 102 refers to sensitivity table 107a stored in sensitivity table storage 107 (step S211). Next, sensitivity corrector 102 recognizes the ambient temperature of gyro sensor 203 indicated by the temperature signal obtained in step S202 in FIG. 12, and obtains the sensitivity associated with the temperature range including the ambient temperature in sensitivity table 107a (step S212). In other words, sensitivity corrector 102 reads, from sensitivity table 107a, the sensitivity associated with the ambient temperature detected by temperature sensor 204.

Sensitivity corrector 102 then calculates the angular velocity, which has undergone the sensitivity correction, by multiplying the angular velocity, which has undergone the offset correction in step S203 in FIG. 12, by the sensitivity obtained in step S212 (step S213).

As described above, in the present embodiment, the angular velocity is corrected using the sensitivity corresponding to the ambient temperature of gyro sensor 203, and the third estimated vehicle orientation is derived using the corrected angular velocity. In a specific example, by correcting the first estimated vehicle orientation using the history of the position of vehicle 2 determined by the satellite positioning system up to a given time and the history of the speed of vehicle 2 up to the given time, the third estimated vehicle orientation can be derived as an accurate orientation of vehicle 2 at the given time. In other words, each time a period during which those histories are obtained passes, an accurate third estimated vehicle orientation can be derived. Here, within the period, the angular velocity detected by gyro sensor 203 may change depending on the change in ambient temperature. However, as described above, the angular velocity is corrected in accordance with the sensitivity corresponding to the ambient temperature of gyro sensor 203, and thus, such variations in gyro sensor 203 due to the change in ambient temperature can be reduced. Accordingly, even in the case described above, the third estimated vehicle orientation can be derived as an accurate orientation of vehicle 2. In other words, even in an environment where the ambient temperature changes, an appropriate third estimated vehicle orientation can be derived. As a result, appropriate display object 10 can be displayed to user 1 while reducing the influence of the ambient temperature of gyro sensor 203. Moreover, the sensitivity stored in sensitivity table storage 107 in association with the temperature range is updated using the calculated sensitivity that is calculated based on the second estimated vehicle orientation and the third estimated vehicle orientation. Accordingly, even when gyro sensor 203 degrades over time, the sensitivity of gyro sensor 203 can be maintained at an appropriate value. As a result, while maintaining the accuracy of the third estimated vehicle orientation, appropriate display object 10 can be displayed to user 1.

(Variation 1)

In the embodiment described above, as an initial value of the sensitivity, a value indicating 1, for example, may be associated in advance with each temperature range of sensitivity table 107a in the initial state. On the other hand, no sensitivity may be associated with each temperature range of sensitivity table 107a in the initial state. With an increase in the number of items of travel data that are added to travel history data 108a, the number of temperature ranges associated with the sensitivities in sensitivity table 107a increases. However, when sensitivity table 107a includes many temperature ranges which are not associated with the sensitivities, sensitivity correction cannot be satisfactory performed. In view of the above, update processor 106 according to the present variation interpolates sensitivities to such sensitivity table 107a. In other words, update processor 106 associates a sensitivity with the temperature range which has not been associated with a sensitivity in sensitivity table 107a, without using travel history data 108a.

FIG. 14 illustrates an example of updating of sensitivity table 107a according to the present variation.

For example, sensitivity table 107a indicates sensitivity "G5" associated with the temperature range "10 to 20° C." and sensitivity "G6" associated with the temperature range "20 to 30° C.". Sensitivity table 107a indicates no sensitivity for the other temperature ranges.

In such a case, update processor 106 may derive sensitivities for the other temperature ranges by linear interpolation or extrapolation. For example, when sensitivities "G5" and "G6" are respectively "0.8" and "0.9", update processor 106 derives "0.7" as the sensitivity for the temperature range "0 to 10° C.", and derives "1.0" as the sensitivity for the temperature range "30 to 40° C.". Update processor 106 then writes the sensitivities thus derived on sensitivity table 107a in association with the temperature ranges. In such a manner, the sensitivities are interpolated.

Moreover, in sensitivity table 107a illustrated in FIG. 14, extrapolation is used for interpolating the sensitivities, but interpolation may be used. For example, in sensitivity table 107a, sensitivity "G3" is associated with temperature range "−10 to 0° C.". In such a case, update processor 106 derives sensitivity "G4" for the temperature range "0 to 10° C." by linear interpolation or interpolation using the temperature range "−10 to 0° C." and the corresponding sensitivity "G3" and the temperature range "10 to 20° C." and the corresponding sensitivity "G5". Update processor 106 then writes sensitivity "G4" on sensitivity table 107a in association with the temperature range "0 to 10° C.". Sensitivities are also interpolated by such an interpolation.

Figure 15:
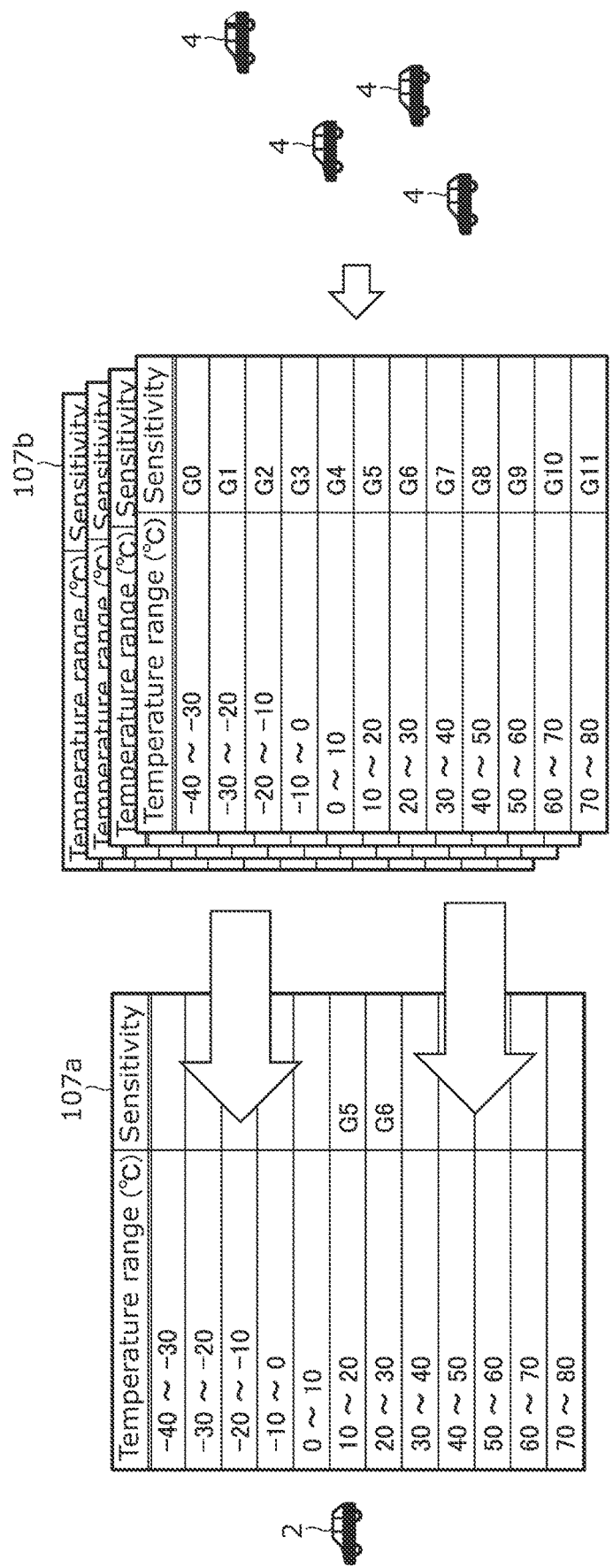
FIG. 15 illustrates another example of updating of the sensitivity table according to Variation 1 of the embodiment.

FIG. 15 illustrates another example of updating of sensitivity table 107a according to the present variation.

For example, in a similar manner to the example in FIG. 14, sensitivity table 107a indicates sensitivity "G5" associated with the temperature range "10 to 20° C." and sensitivity "G6" associated with the temperature range "20 to 30° C.". Sensitivity table 107a indicates no sensitivity for the other temperature ranges.

In such a case, update processor 106 obtains, from one or more other vehicles 4, sensitivity tables 107b used in vehicles 4 via a communication network such as the Internet. Update processor 106 then interpolates the sensitivities in sensitivity table 107a of vehicle 2 using such sensitivity tables 107b. Each vehicle 4 includes display device 100, and update processor 106 of display device 100 transmits sensitivity table 107b via the communication network to the cloud server. The cloud server accumulates sensitivity tables 107b of vehicles 4. Update processor 106 of display device 100 provided on vehicle 2 then requests the cloud server to transmit sensitivity tables 107b.

Specifically, update processor 106 of vehicle 2 requests transmission of sensitivity tables 107b of vehicles 4 which satisfy a first condition and a second condition. The first condition is a condition in which sensitivities are indicated for the temperature ranges which are not associated with sensitivities in sensitivity table 107a. The second condition is a condition in which a sensitivity is indicated which is closest to the sensitivity in sensitivity table 107a relative to the temperature range that is the same as the temperature range associated with the sensitivity in sensitivity table 107a. When update processor 106 of vehicle 2 obtains sensitivity table 107b which satisfies the conditions from the cloud server, update processor 106 copies the sensitivities indicated in sensitivity table 107b to sensitivity table 107a. In other words, update processor 106 searches sensitivity table 107b for the temperature range identical to the temperature range in sensitivity table 107a which is not associated with a sensitivity. Update processor 106 then associates the sensitivity, which is associated with the temperature range in sensitivity table 107b, with the temperature range in sensitivity table 107a of vehicle 2. In such a manner, sensitivities are interpolated in sensitivity table 107a of vehicle 2.

(Variation 2)

In sensitivity table 107a in the above embodiment and Variation 1, the sensitivities are associated with the temperature ranges. In a sensitivity table according to the present variation, not only the sensitivities but also reliabilities of the sensitivities are associated with the temperature ranges.

FIG. 16 illustrates an example of a sensitivity table according to the present variation.

In sensitivity table 107c according to the present variation, for example, as illustrated in FIG. 16, a sensitivity and the reliability of the sensitivity are associated with each other for each temperature range. For example, for the temperature range "0 to 10° C.", sensitivity "G4" and reliability "T4" of sensitivity "G4" are associated with each other. In other words, in the present variation, sensitivity table storage 107 stores sensitivity table 107c which indicates sensitivities each associated with a different one of mutually different temperature ranges and the reliability of each sensitivity.

For example, in the initial state of sensitivity table 107c, a predetermined initial value of a sensitivity and a predetermined initial value of a reliability may be associated with each other for each temperature range. When updating each sensitivity in sensitivity table 107c, update processor 106 also updates the reliability of the sensitivity. In other words, when updating a sensitivity indicated in sensitivity table 107c using a calculated sensitivity, update processor 106 further updates the reliability of the sensitivity indicated in sensitivity table 107c. With this, the sensitivity and the reliability of the sensitivity indicated in sensitivity table 107c can be appropriately maintained.

In a specific example, when updating the reliability of a sensitivity, update processor 106 updates the reliability of the sensitivity in accordance with the travel data indicating the traveling state of vehicle 2 at the time of calculating the calculated sensitivity. The accuracy of the calculated sensitivity changes depending on the travel state of vehicle 2. Hence, by updating the reliability of the sensitivity indicated in sensitivity table 107c in accordance with the travel data, the accuracy of the calculated sensitivity is reflected to the reliability, and the reliability can be appropriately updated.

More specifically, update processor 106 updates the reliability of the sensitivity to a higher reliability with an increase in the angle of the turn made by vehicle 2 indicated by the travel data. For example, as in the example, illustrated in FIG. 5, after vehicle 2 passes the first spot at time "t03", vehicle 2 makes a right turn, and passes the second spot at time "t04". In such a case, update processor 106 calculates the sensitivity of gyro sensor 203 as a calculated sensitivity using the second estimated vehicle orientations "Ψ203" and "Ψ204" and third estimated vehicle orientations "Ψ303" and "Ψ304" indicated in travel history data 108a. At this time, update processor 106 uses, as the angle of the turn made by vehicle 2, the amount of change in second estimated vehicle orientation "Ψ204-Ψ203" or the amount of change in third estimated vehicle orientation "Ψ304-Ψ303", and calculates a higher reliability with an increase in the angle. Update processor 106 then replaces, with the calculated reliability, the reliability of the sensitivity associated with the temperature range including ambient temperatures "T03" and "T04" in sensitivity table 107c, to update the reliability. With an increase in the angle of the turn made by vehicle 2, the accuracy of the calculated sensitivity increases. Accordingly, by updating the reliability to a higher reliability with an increase in the angle, the reliability can be appropriately updated.

Moreover, update processor 106 may update the reliability of the sensitivity to a higher reliability with an increase in the distance of each of two straight sections indicated by travel history data 108a. The two straight sections are the sections where vehicle 2 traveled straight before and after vehicle 2 made a turn. Since travel history data 108a includes a plurality of items of travel data, it can be said that the two straight sections are indicated by such travel data.

For example, as in the example illustrated in FIG. 5, after vehicle 2 passes the first spot at time "t03", vehicle 2 makes a right turn, and passes the second spot at time "t04". In such a case, update processor 106 identifies, for example, respective positions "XY03", "XY02", and "XY01" where vehicle 2 passed before time "t03" which are indicated by travel history data 108a. Update processor 106 then searches the identified positions for one or more positions aligned along a straight line from position "XY03". Update processor 106 determines the distance between the position furthest from position "XY03" and position "XY03" among the one or more positions as the distance of the straight section before vehicle 2 made a turn. In a similar manner, update processor 106 identifies, for example, respective positions "XY04", "XY05", and "XY06" where vehicle 2 passed after time "t04" which are indicated by travel history data 108a. Update processor 106 then searches the identified positions for one or more positions aligned along a straight line from position "XY04". Update processor 106 determines the distance between the position furthest from position "XY04" and position "XY04" among the one or more positions as the distance of the straight section after vehicle 2 made a turn. Update processor 106 updates the reliability using the distances of such straight sections. Respective items of travel data included in travel history data 108a may directly indicate the distance of the straight section up to when the travel data is obtained. The accuracy of the calculated sensitivity increases with an increase in the distance between each of two straight sections. Hence, the reliability of the sensitivity is updated to a higher reliability with an increase in the distance, so that the reliability can be appropriately updated. The straight section is a section where vehicle 2 traveled straight, in other words, the section where respective positions where vehicle 2 passed are aligned along a straight line. However, the straight travel and the straight line do not have to be accurate. For example, when the distance between an approximate straight line obtained from those positions and each position is less than or equal to a threshold value, it may be interpreted that vehicle 2 traveled straight and the respective positions are aligned along a straight line.

Moreover, each item of travel data included in travel history data 108a may indicate the travel time of vehicle 2 up to when the travel data is obtained. The travel time is the time taken from when vehicle 2 was stopped most recently till when vehicle 2 is continuously traveling. In such a case, update processor 106 may update the reliability of the sensitivity to a higher reliability with a decrease in the travel time of vehicle 2 indicated by the travel data obtained at the time of the sensitivity calculation. For example, when vehicle 2 is stopped, an offset value is determined which is used for performing offset correction on gyro sensor 203. Accordingly, as the travel time after vehicle 2 was stopped decreases, the deviation of the offset value is less likely to occur. As a result, the accuracy of the calculated sensitivity increases with a decrease in the travel time. Hence, by updating the reliability of the sensitivity to a higher reliability with a decrease in the travel time, the reliability can be appropriately updated.

Moreover, respective items of travel data included in travel history data 108a may indicate the length of the stopped time of the vehicle and the number of times the vehicle was stopped. The length of the stopped time may be the time during which vehicle 2 was stopped most recently before the travel data is obtained. The number of times the vehicle was stopped may be the number of times vehicle 2 was stopped during a predetermined period before when the travel data is obtained. In such a case, update processor 106 may update the reliability of the sensitivity to a higher reliability with an increase in the length of the stopped time of vehicle 2 and the number of times vehicle 2 was stopped indicated by the travel data obtained at the time of the calculation of the calculated sensitivity. As described above, when vehicle 2 is stopped, an offset value is determined which is used for performing offset correction on gyro sensor 203. Accordingly, with an increase in the length of the stopped time of vehicle 2 and in the number of times vehicle 2 was stopped, the deviation of the offset value is less likely to occur. As a result, with an increase in the length of the stopped time, the accuracy of the calculated sensitivity increases. Hence, by updating the reliability of the sensitivity to a higher reliability with an increase in the length of the stopped time, the reliability can be appropriately updated. In a similar manner, with an increase in the number of times the vehicle was stopped, the accuracy of the calculated sensitivity increases. Hence, by updating the reliability of the sensitivity to a higher reliability with an increase in the number of times the vehicle was stopped, the reliability can be appropriately updated.

When the engine of vehicle 2 is started, update processor 106 may also decrease each reliability indicated in sensitivity table 107c more significantly with an increase in the elapsed time from when the engine of vehicle 2 was stopped till when the engine is started. Update processor 106 may obtain information indicating the elapsed time from an external apparatus of display device 100. For example, update processor 106 may decrease each reliability by the same value or at the same rate. With an increase in the elapsed time from when the engine was stopped, the sensitivity of gyro sensor 203 is highly likely to have been greatly changed from the sensitivity before the engine was stopped. Accordingly, by decreasing each reliability indicated in the sensitivity table more significantly with an increase in the elapsed time from when the engine was stopped, the reliability can be appropriately managed.

When using sensitivity table 107c illustrated in FIG. 16, sensitivity corrector 102 refers to the reliability indicated in sensitivity table 107c, and determines the sensitivity used for correcting the sensitivity of the angular velocity based on the reliability. In other words, sensitivity corrector 102 determines whether or not a target reliability is greater than or equal to a threshold value in sensitivity table 107c. The target reliability is the reliability associated with the temperature range including the ambient temperature detected by temperature sensor 204. When the target reliability is greater than or equal to the threshold value, sensitivity corrector 102 obtains the sensitivity with the target reliability from sensitivity table storage 107, and uses the obtained sensitivity for correcting the sensitivity of the angular velocity. On the other hand, when the target reliability is less than the threshold value, sensitivity corrector 102 derives an alternative sensitivity, and uses the alternative sensitivity for correcting the sensitivity of the angular velocity. In such a manner, adaptive processing that is in accordance with the reliability of the sensitivity can be performed. In other words, when the target reliability is low, the angular velocity is corrected using an alternative sensitivity instead of the sensitivity with the target reliability. Hence, an appropriate correction is more likely to be performed while reducing a correction that is performed based on an unreliable sensitivity. The threshold value for the target reliability may be, for example, 0.5.

Figure 17:
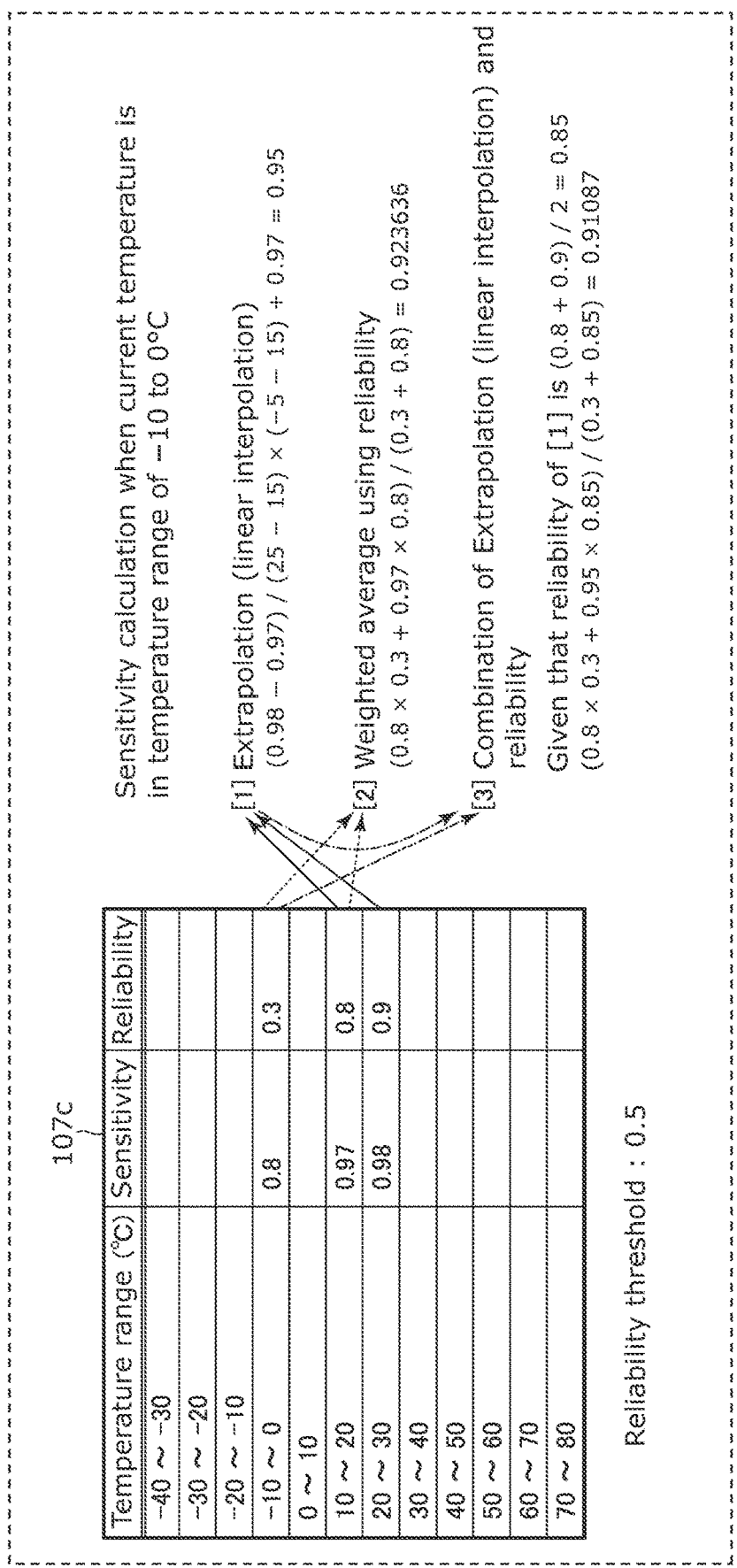
FIG. 17 illustrates an example of deriving of an alternative sensitivity according to Variation 2 of the embodiment.

FIG. 17 illustrates an example of deriving of an alternative sensitivity according to the present variation.

[1: Extrapolation (Linear Interpolation)]

When the target reliability is less than the threshold value, sensitivity corrector 102 obtains, from sensitivity table storage 107, a first sensitivity and a second sensitivity each having a reliability that is greater than or equal to the threshold value. In other words, sensitivity corrector 102 reads, from sensitivity table 107c, the first sensitivity and the second sensitivity each of which is associated with a reliability that is greater than or equal to the threshold value. Sensitivity corrector 102 then derives an alternative sensitivity by extrapolation or linear interpolation of the sensitivity based on the first sensitivity, the second sensitivity, the temperature ranges associated with the first sensitivity and the second sensitivity, and the temperature range associated with the target reliability. With this, when the target reliability is low, the first sensitivity and the second sensitivity each having a high reliability, and linearity and the like of the sensitivity for each temperature range may be used so that an alternative sensitivity with a reliability that is higher than the sensitivity with the target reliability is more likely to be derived. Accordingly, an appropriate correction of the sensitivity of the angular velocity is more likely to be performed by using such an alternative sensitivity.

In a specific example, the threshold value is 0.5. The temperature range including the ambient temperature detected by temperature sensor 204 at this time is "−10 to 0° C.". In this case, sensitivity corrector 102 determines whether or not the target reliability (that is 0.3) which is the reliability associated with the temperature range "−10 to 0° C." is greater than or equal to threshold value "0.5". Here, sensitivity corrector 102 determines that the target reliability is not greater than or equal to the threshold value, that is, determines that the target reliability is less than the threshold value. As a result, sensitivity corrector 102 reads, from sensitivity table 107c, first sensitivity "0.98" and second sensitivity "0.97" each associated with a reliability that is greater than or equal to threshold value "0.5". Sensitivity corrector 102 then performs extrapolation or linear interpolation on the sensitivity based on first sensitivity "0.98", second sensitivity "0.97", temperature range "20 to 30° C." associated with first sensitivity "0.98", temperature range "10 to 20° C." associated with second sensitivity "0.97", and temperature range "−10 to 0° C." associated with target reliability "0.3".

In a more specific example, sensitivity corrector 102 first calculates the median value of each of temperature ranges "20 to 30° C.", "10 to 20° C." and "−10 to 0° C.". In other words, sensitivity corrector 102 calculates median values "25° C.", "15° C.", and "−5° C.". Sensitivity corrector 102 derives alternative sensitivity "0.95" by (first sensitivity "0.98"−second sensitivity "0.97")/(median value "25"−median value "15")×(median value "−5° C."−median value "15° C.")+second sensitivity "0.97". The alternative sensitivity "0.95" is used for correcting the sensitivity of the angular velocity instead of sensitivity "0.8" of the temperature range "−10 to 0° C.". In the example illustrated in FIG. 17, an alternative sensitivity is derived by extrapolation, but an alternative sensitivity may be derived by interpolation. For example, when sensitivity table 107c indicates the sensitivity of the temperature range "−20 to 10° C." and the reliability of the sensitivity that is greater than or equal to the threshold value, sensitivity corrector 102 derives an alternative sensitivity by interpolation using the temperature range "−20 to −10° C." and the corresponding sensitivity. In other words, sensitivity corrector 102 derives an alternative sensitivity of the temperature range "−10 to 0° C." by interpolation using the temperature range "−20 to −10° C." and the corresponding sensitivity, and the temperature range "10 to 20° C." and the corresponding sensitivity.

Moreover, sensitivity corrector 102 may select, as the temperature ranges used for extrapolation, interpolation, or linear interpolation, two temperature ranges closest to the temperature range "−10 to 0° C." which is associated with target reliability "0.3". The number of selected temperature ranges is not limited to two, but may be three or more.

[2. Weighted Average Using Reliability]

When the target reliability is less than the threshold value, sensitivity corrector 102 obtains, from sensitivity table storage 107, a low-reliability sensitivity that is a sensitivity with the target reliability and a high-reliability sensitivity that is a sensitivity with a reliability that is greater than or equal to the threshold value. In other words, sensitivity corrector 102 reads a low-reliability sensitivity and a high-reliability sensitivity from sensitivity table 107c. Sensitivity corrector 102 then derives an alternative sensitivity by performing weighed average on the low-reliability sensitivity and the high-reliability sensitivity using a weight that is based on the reliability of each of the low-reliability sensitivity and the high-reliability sensitivity. With this, when the target reliability is low, by using a high-reliability sensitivity, an alternative sensitivity with a reliability that is higher than the low-reliability sensitivity with the target reliability is more likely to be derived. Accordingly, an appropriate correction of the sensitivity of the angular velocity is more likely to be performed by using such an alternative sensitivity.

In a specific example, in a similar manner to the above, the threshold value is 0.5. Moreover, the temperature range including the ambient temperature detected by temperature sensor 204 at this moment is "−10 to 0° C.". In this case, sensitivity corrector 102 determines that the target reliability (that is 0.3) which is the reliability associated with the temperature range "−10 to 0° C." is less than threshold value "0.5". As a result, sensitivity corrector 102 reads, from sensitivity table 107c, low-reliability sensitivity "0.8" that is a sensitivity with target reliability "0.3" and high-reliability sensitivity "0.97" that is a sensitivity with a reliability that is greater than or equal to threshold value "0.5". Sensitivity corrector 102 then derives an alternative sensitivity by performing a weighted average on low-reliability sensitivity "0.8" and high-reliability sensitivity "0.97" using a weight that is based on reliability "0.3" of low-reliability sensitivity "0.8" and reliability "0.8" of high-reliability sensitivity "0.97". In other words, sensitivity corrector 102 derives alternative sensitivity "0.923636" by (low-reliability sensitivity "0.8"×reliability "0.3"+high-reliability sensitivity "0.97"×reliability "0.8")/(reliability "0.3"+reliability "0.8"). Alternative sensitivity "0.923636" is used for correcting the sensitivity of the angular velocity instead of sensitivity "0.8" of temperature range "−10 to 0° C.". Alternative sensitivity "0.923636" may be treated as "0.92" with respect to significant figures.

Moreover, sensitivity corrector 102 may use, for a weighted average, a high-reliability sensitivity associated with the temperature range that is closest to temperature range "−10 to 0° C." of target reliability "0.3" among one or more high-reliability sensitivities indicated in sensitivity table 107c.

[3: Combination of Extrapolation (Linear Interpolation) and Weighted Average Using Reliability]

Sensitivity corrector 102 may derive an alternative sensitivity by a combination of extrapolation (linear interpolation) and weighted average using reliability. Specifically, sensitivity corrector 102 first derives temporary alternative sensitivity "0.95" of temperature range "−10 to 0° C." by extrapolation or linear interpolation described above. Sensitivity corrector 102 further derives the reliability of temporary alternative sensitivity "0.95". In the derivation of the reliability, for example, reliabilities "0.8" and "0.9" associated with the temperature ranges "10 to 20° C." and "20 to 30° C." used in the extrapolation or linear interpolation are used. In other words, sensitivity corrector 102 derives reliability "0.85" of temporary alternative sensitivity "0.95" by (reliability "0.8"+reliability "0.9")/2. Next, sensitivity corrector 102 derives a final alternative sensitivity by performing a weighted average using temporary alternative sensitivity "0.95" and reliability "0.85" of alternative sensitivity "0.95" instead of high-reliability sensitivity "0.97" and reliability "0.8" of high-reliability sensitivity "0.97". In other words, sensitivity corrector 102 derives final alternative sensitivity "0.91087" by "low-reliability sensitivity "0.8"×reliability "0.3"+temporary alternative sensitivity "0.95"×reliability "0.85")/reliability "0.3"+reliability "0.85"). Final alternative sensitivity "0.91087" is used for correcting the sensitivity of the angular velocity instead of sensitivity "0.8" of temperature range "−10 to 0° C.". Alternative sensitivity "0.91087" may be treated as "0.91" with respect to significant figures.

Moreover, when the target reliability is less than the threshold value and greater than the other reliabilities indicated in sensitivity table 107c, sensitivity corrector 102 may use the sensitivity with the target reliability as an alternative sensitivity. In other words, in such a case, even when the target reliability is low, sensitivity corrector 102 uses the sensitivity with the target reliability without a change for correcting the sensitivity of the angular velocity. With this, when the target reliability is low and all the other reliabilities indicated in sensitivity table 107c are lower than the target reliability, for example, the sensitivity with the target reliability is used without a change as an alternative sensitivity. Accordingly, it is possible to prevent a less reliable sensitivity from being derived using another reliability indicated in sensitivity table 107c, and the angular velocity from being corrected using such an unreliable sensitivity.

Moreover, update processor 106 according to the present variation may perform a weighted average as described above when updating a sensitivity in sensitivity table 107c. In other words, when updating a sensitivity associated with a temperature range in sensitivity table 107c, update processor 106 derives the reliability of the calculated sensitivity based on the travel data as a calculated reliability. Update processor 106 then derives an updated sensitivity by performing a weighted average on the sensitivity and the calculated sensitivity using a weight that is based on the reliability associated with the temperate range in sensitivity table 107c and the calculated reliability. For example, update processor 106 derives a calculated reliability by a method that is the same as the described updating of the reliability. Moreover, as an example, the reliability associated with the temperature range is "T", the calculated reliability is "Tc", the sensitivity associated with the temperature range is "G", and the calculated sensitivity is "Gc". In such a case, update processor 106 derives an updated sensitivity by performing a weighted average such as (G×T+Gc×Tc)/(T+Tc). With this, using the reliability of the calculated sensitivity (that is calculated reliability) and the reliability of the sensitivity indicated in sensitivity table 107c, the sensitivity can be updated appropriately. When a sensitivity indicated in sensitivity table 107c is updated in such a manner, reliability "T" of the sensitivity may be updated using reliability "T" and calculated reliability "Tc". For example, update processor 106 may derive an updated reliability by formula "1−(1−T)×(1−Tc)", and replace reliability "T" indicated in sensitivity table 107c with the updated reliability.

In the above example, even when the reliability of the sensitivity indicated in sensitivity table 107c is low, display device 100 derives an alternative sensitivity and displays display object 10. However, it may be difficult to display display object 10 which indicates an appropriate orientation even when the angular velocity is corrected with the alternative sensitivity. Alternatively, when even one sensitivity with a reliability that is greater than or equal to the threshold value is missing in sensitivity table 107c, it may be difficult to derive the alternative sensitivity. In such a case, display device 100 does not have to display display object 10. In other words, display unit 110 may prohibit output of an image that is display object 10 when the target reliability is less than the threshold value. With this, when the target reliability is low, output of display object based on a sensitivity with the determination reliability is prohibited. Hence, it is possible to prevent inappropriate display object 10 from being displayed. When the target reliability is less than the threshold value and the angle of the turn made by vehicle 2 is greater than a predetermined angle, display unit 110 may prohibit output of display object 10 after the turn.

Alternatively, when the target reliability is less than the threshold value, display unit 110 may change the display mode of an image that is display object 10, and output the image in the display mode after the change. In the above example, display object 10 is displayed in an AR content display mode. Display unit 110 changes the AR content display mode into a non-AR content display mode. In other words, display unit 110 changes the AR display mode into the non-AR display mode. The AR content display mode is a display mode in which a triangular image is displayed above the road surface by a predetermined distance and in parallel with the road surface. The non-AR content display mode is a display mode in which a triangular image is not displayed in parallel with the road surface and the position relationship between the triangle and background including the road surface is not defined. With this, it is possible to prevent an inappropriate image from being displayed in the AR content display mode. When the target reliability is less than the threshold value and the angle of the turn made by vehicle 2 is greater than a predetermined angle, display unit 110 may change the display mode of display object 10 after the turn and display display object 10 in the display mode after the change.

Figure 18:
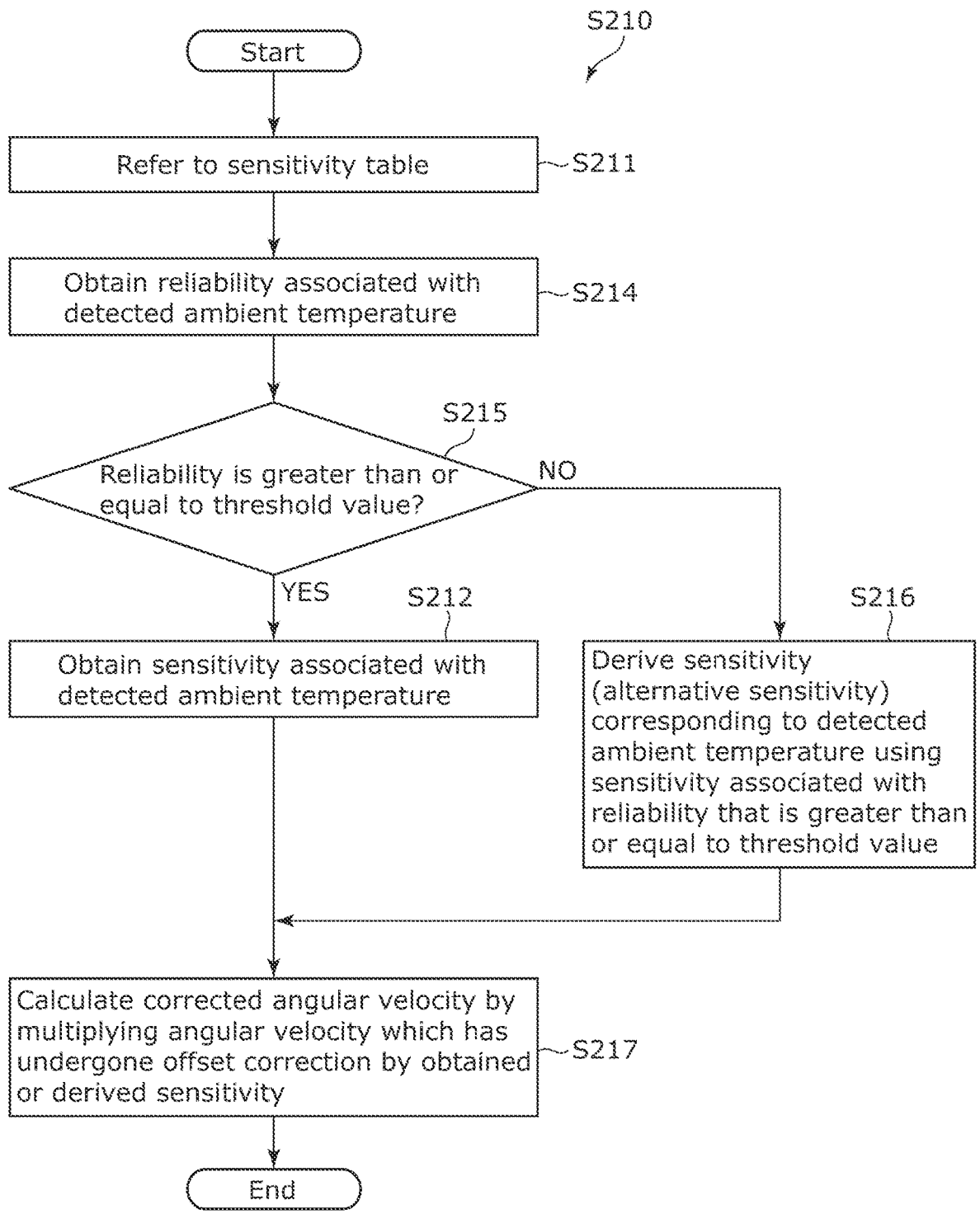
FIG. 18 is a flowchart illustrating an example of a process of correcting a sensitivity according to Variation 2 of the embodiment.

FIG. 18 is a flowchart illustrating an example of a process of correcting a sensitivity according to the present variation. In other words, the flowchart in FIG. 18 illustrates the details of step S210 in FIG. 12.

First, sensitivity corrector 102 refers to sensitivity table 107c stored in sensitivity table storage 107 (step S211). Next, sensitivity corrector 102 recognizes the ambient temperature of gyro sensor 203 indicated by the temperature signal obtained in step S202 in FIG. 12, and obtains the reliability associated with the temperature range including the ambient temperature in sensitivity table 107c (step S214). In other words, sensitivity corrector 102 reads, from sensitivity table 107c, the reliability associated with the ambient temperature detected by temperature sensor 204.

Sensitivity corrector 102 then determines whether or not the reliability obtained in step S214 is greater than or equal to a threshold value (step S215). This reliability is the target reliability described above. Here, when determining that the target reliability is greater than or equal to the threshold value (YES in step S215), sensitivity corrector 102 obtains the sensitivity associated with the detected ambient temperature in sensitivity table 107c (step S212). Sensitivity corrector 102 then calculates angular velocity which has undergone the sensitivity correction, by multiplying the angular velocity which has undergone the offset correction in step S203 in FIG. 12 by the sensitivity obtained in step S212 (step S217).

On the other hand, when determining in step S215 that the target reliability is less than the threshold value (NO in step S215), sensitivity corrector 102 derives an alternative sensitivity (step S216). In other words, sensitivity corrector 102 derives the sensitivity for the detected ambient temperature as an alternative sensitivity using the sensitivity associated with the reliability that is greater than or equal to the threshold value in sensitivity table 107c. In step S217, sensitivity corrector 102 then calculates the angular velocity which has undergone the sensitivity correction, by multiplying the angular velocity by the alternative sensitivity derived in step S216.

Other Embodiments

Although the display device according to the present disclosure has been described based on the embodiment and the variations thereof, the present disclosure is not limited to such an embodiment and variations. Various modifications of the embodiment and variations that may be conceived by those skilled in the art are intended to be included within the scope of the present disclosure as long as these do not depart from the essence of the present disclosure.

For example, in the embodiment and the variations thereof, a triangular image is displayed as display object 10. However, the shape of display object 10 is not limited to triangle, but may be any shape such as a shape of an arrowhead or an arrow. Moreover, display object 10 may be displayed in an elongated carpet shape so as to be superimposed over the road surface. Display object 10 is displayed to guide vehicle 2 to the destination, but may be displayed for another object or purpose as long as display object 10 is displayed based on the orientation of vehicle 2 (that is the third estimated vehicle orientation). For example, display object 10 may be an image which indicates the orientation itself of vehicle 2.

In the above embodiment, each structural element may be configured by dedicated hardware or realized by executing a software program suitable for the structural element. Each structural element may be realized by a program executor, such as a central processing unit (CPU) or a processor, reading and executing a software program recorded on a recording medium such as a hard disk or a semiconductor memory. For example, a plurality of structural elements which are included in display device 100 and are other than sensitivity table storage 107, data storage 108, and display unit 110 may be realized by one or more processors. The one or more processors execute the processing of the structural elements by executing a computer program stored in a recording medium. Here, a software program or a computer program which realizes display device 100 and the like in the above embodiment causes a computer to execute, for example, each step included in the flowcharts in FIG. 8 to FIG. 13 and FIG. 18.

The present disclosure also includes the following cases.
(1) At least one device described above is specifically a computer system including a microprocessor, a read only memory (ROM), a random access memory (RAM), a hard disk unit, a display unit, a keyboard, a mouse and the like. The RAM or the hard disk unit stores a computer program. The at least one device achieves its function by the microprocessor operating according to the computer program. Here, a computer program is formed of combinations of instruction codes indicating commands to a computer to achieve a predetermined function.
(2) Part or all of the structural elements included in the at least one device described above may be configured by a single system large scale integration (LSI). The system LSI is an ultra-multifunctional LSI manufactured by integrating a plurality of structural elements on a single chip, and specifically, is a computer system including a microprocessor, a ROM, a RAM and the like. A computer program is stored in the RAM. The system LSI achieves its function by the microprocessor operating according to the computer program.
(3) Part or all of the structural elements included in the at least one device described above may be configured with an integrated circuit (IC) card that is removable from the device or a single module. The IC card or module is a computer system including a microprocessor, a ROM, a RAM and the like. The IC card or module may include the above-mentioned ultra-multifunctional LSI. The IC card or module achieves its function by the microprocessor operating according to the computer program. The IC card or module may be tamper resistant.
(4) The present disclosure may be the method described above. Moreover, the method may be a computer program implemented by a computer or a digital signal configured from the computer program.

Moreover, the present disclosure may be a computer program or a digital signal recorded on a computer-readable recording medium, such as a flexible disk, a hard disk, a compact disc (CD)-ROM, a DVD, a DVD-ROM, a DVD-RAM, a BD (Blu-ray (registered trademark) Disc), and a semiconductor memory. Moreover, it may be the digital signal recorded on these recording media.

Moreover, the present disclosure may transmit the computer program or digital signal via an electronic communication line, a wireless or wired communication line, a network represented by the Internet, a data broadcast, or the like.

Moreover, the program or the digital signal may be recorded on a recording medium and transferred, or the program or the digital signal may be transferred via a network or the like to be implemented by another independent computer system.

While an embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2022-050173 filed on Mar. 25, 2022.

INDUSTRIAL APPLICABILITY

A display device according to the present disclosure is capable of displaying an appropriate image to a user while reducing an influence of the ambient temperature of the angular velocity sensor. The display device is applicable to, for example, a head-up display provided on a vehicle.

The invention claimed is:
1. A display device comprising:
a processing circuit; and
a display,
wherein the processing circuit:
obtains an ambient temperature of an angular velocity sensor provided on a vehicle, obtains a sensitivity of the angular velocity sensor from a recording medium, and corrects an angular velocity detected by the angular velocity sensor in accordance with the sensitivity obtained, the ambient temperature being detected by a temperature sensor, the sensitivity of the angular velocity sensor being associated with a temperature range including the ambient temperature;
estimates, as a first estimated vehicle orientation, an orientation that the vehicle faces based on the angular velocity corrected;
estimates, as a second estimated vehicle orientation, the orientation that the vehicle faces based on the angular velocity detected by the angular velocity sensor;
derives a third estimated vehicle orientation by correcting the first estimated vehicle orientation using a position of the vehicle determined by a satellite positioning system and a speed of the vehicle; and
calculates, as a calculated sensitivity, the sensitivity of the angular velocity sensor based on the second estimated vehicle orientation and the third estimated vehicle orientation, and updates the sensitivity which is stored in the recording medium in association with the temperature range, using the calculated sensitivity, and
the display displays an image that is in accordance with the third estimated vehicle orientation.

2. The display device according to claim 1,
wherein, in calculating the calculated sensitivity, when the vehicle makes a turn after passing a first spot and passes a second spot, the processing circuit calculates the calculated sensitivity based on an amount of change in the second estimated vehicle orientation estimated at each of the first spot and the second spot and an amount of change in the third estimated vehicle orientation derived at each of the first spot and the second spot.

3. The display device according to claim 1,
wherein, in deriving the third estimated vehicle orientation, the processing circuit:
estimates a deviation of the orientation of the vehicle based on
(a) a first position of the vehicle determined by the satellite positioning system,
(b) a second position of the vehicle determined by the satellite positioning system when the vehicle moves from the first position, and
(c) an estimated position of the vehicle estimated based on dead reckoning performed when the second position is determined, the dead reckoning being performed using the first position, the orientation of the vehicle at the first position, the angular velocity detected by the angular velocity sensor, and the speed of the vehicle; and
corrects the first estimated vehicle orientation in accordance with the deviation of the orientation of the vehicle.

4. The display device according to claim 3,
wherein, in deriving the third estimated vehicle orientation, the processing circuit estimates, as the deviation of the orientation of the vehicle, an angle formed by a straight line connecting the first position and the second position and a straight line connecting the first position and the estimated position.

5. The display device according to claim 1,
wherein the recording medium stores a sensitivity table indicating sensitivities each associated with a different one of a plurality of temperature ranges which are mutually different, and
in correcting the angular velocity, the processing circuit:
obtains, from the recording medium, a sensitivity which is associated with one of the plurality of temperature ranges in the sensitivity table, the one of the plurality of temperature ranges including the ambient temperature detected by the temperature sensor; and
uses the sensitivity obtained to correct the angular velocity.

6. The display device according to claim 1,
wherein the recording medium stores a sensitivity table which indicates sensitivities and reliabilities of the sensitivities, the sensitivities each being associated with a different one of a plurality of temperature ranges which are mutually different,
in correcting the angular velocity, the processing circuit:
determines whether or not a target reliability is greater than or equal to a threshold value in the sensitivity table, the target reliability being a reliability which is associated with one of the plurality of temperature ranges which includes the ambient temperature detected by the temperature sensor;
when the target reliability is greater than or equal to the threshold value, obtains a sensitivity with the target reliability from the recording medium, and uses the sensitivity obtained to correct the angular velocity; and
when the target reliability is less than the threshold value, derives an alternative sensitivity, and uses the alternative sensitivity to correct the angular velocity.

7. The display device according to claim 6,
wherein, in correcting the angular velocity, when the target reliability is less than the threshold value, the processing circuit:
obtains a low-reliability sensitivity and a high-reliability sensitivity from the recording medium, the low-reliability sensitivity being a sensitivity with a reliability that is the target reliability, the high-reliability sensitivity being a sensitivity with a reliability that is greater than or equal to the threshold value; and
derives the alternative sensitivity by performing a weighted average on the low-reliability sensitivity and the high-reliability sensitivity using a weight that is based on the reliability of the low-reliability sensitivity and the reliability of the high-reliability sensitivity.

8. The display device according to claim 6,
wherein, in correcting the angular velocity, when the target reliability is less than the threshold value, the processing circuit:
obtains a first sensitivity and a second sensitivity from the recording medium, the first sensitivity and the second sensitivity each being a sensitivity with a reliability that is greater than or equal to the threshold value; and
derives the alternative sensitivity by performing extrapolation, interpolation or linear interpolation on a sensitivity based on (i) the first sensitivity and the second sensitivity, (ii) a temperature range associated with the first sensitivity and a temperature range associated with the second sensitivity, and (iii) a temperature range associated with the target reliability.

9. The display device according to claim 6,
wherein, in correcting the angular velocity, the processing circuit uses a sensitivity with the target reliability as the alternative sensitivity when the target reliability is less than the threshold value and is greater than remaining one or more of the reliabilities indicated in the sensitivity table.

10. The display device according to claim 6,
wherein, in updating a sensitivity indicated in the sensitivity table as the sensitivity stored in the recording medium using the calculated sensitivity, the processing circuit further updates the reliability of the sensitivity indicated in the sensitivity table.

11. The display device according to claim 10,
wherein, in updating the reliability of the sensitivity, the processing circuit updates the reliability of the sensitivity in accordance with travel data which indicates a traveling state of the vehicle obtained when the calculated sensitivity is calculated.

12. The display device according to claim 11,
wherein the processing circuit updates the reliability of the sensitivity to a higher reliability with an increase in an angle of a turn made by the vehicle, the angle being indicated by the travel data.

13. The display device according to claim 11,
wherein the processing circuit updates the reliability of the sensitivity to a higher reliability with an increase in a distance of each of two straight sections indicated by the travel data, and
the two straight sections are sections where the vehicle traveled straight before and after making a turn.

14. The display device according to claim 11,
wherein the processing circuit updates the reliability of the sensitivity to a higher reliability with a decrease in a travel time of the vehicle indicated by the travel data.

15. The display device according to claim 11,
wherein the processing circuit updates the reliability of the sensitivity to a higher reliability with an increase in a length of a stopped time of the vehicle and in a total number of times the vehicle was stopped, the length of the stopped time and the total number of times the vehicle was stopped being indicated by the travel data.

16. The display device according to claim 6,
wherein, when an engine of the vehicle is started, the processing circuit decreases each reliability indicated in the sensitivity table more significantly with an increase in an elapsed time from when the engine of the vehicle was stopped to when the engine is started.

17. The display device according to claim 11,
wherein, in updating the sensitivity associated with the temperature range in the sensitivity table, the processing circuit:
derives a reliability of the calculated sensitivity as a calculated reliability based on the travel data; and
derives an updated sensitivity by performing a weighted average on the sensitivity and the calculated sensitivity using a weight that is based on the calculated reliability and a reliability associated with the temperature range in the sensitivity table.

18. The display device according to claim 6,
wherein, when the target reliability is less than the threshold value, the display prohibits output of the image.

19. The display device according to claim 6,
wherein, when the target reliability is less than the threshold value, the display changes a display mode of the image, and outputs the image in the display mode after the change.

20. A display method of displaying an image with a computer, the display method comprising:
obtaining an ambient temperature of an angular velocity sensor provided on a vehicle, obtaining a sensitivity of the angular velocity sensor from a recording medium, and correcting an angular velocity detected by the angular velocity sensor in accordance with the sensitivity obtained, the ambient temperature being detected by a temperature sensor, the sensitivity of the angular velocity sensor being associated with a temperature range including the ambient temperature;
estimating an orientation that the vehicle faces as a first estimated vehicle orientation based on the angular velocity corrected in accordance with the sensitivity;
estimating the orientation that the vehicle faces as a second estimated vehicle orientation based on the angular velocity detected by the angular velocity sensor;
deriving a third estimated vehicle orientation by correcting the first estimated vehicle orientation using a position of the vehicle determined by a satellite positioning system and a speed of the vehicle;
causing a display to display an image that is in accordance with the third estimated vehicle orientation; and
calculating the sensitivity of the angular velocity sensor as a calculated sensitivity based on the second estimated vehicle orientation and the third estimated vehicle orientation, and updating the sensitivity which is stored in the recording medium in association with the temperature range, using the calculated sensitivity.

\* \* \* \* \*